US008814253B1

(12) United States Patent
Butler et al.

(10) Patent No.: US 8,814,253 B1
(45) Date of Patent: Aug. 26, 2014

(54) AERODYNAMIC QUARTER FENDER ASSEMBLY AND CONSTRUCTION METHOD

(75) Inventors: Joshua Butler, Austin, TX (US); Kyle Walker, Austin, TX (US); Bruce Lee, Lewisville, TX (US)

(73) Assignee: FlowBelow, LLC, Austin, TX (US)

( * ) Notice: Subject to any disclaimer, the term of this patent is extended or adjusted under 35 U.S.C. 154(b) by 0 days.

(21) Appl. No.: 13/452,249

(22) Filed: Apr. 20, 2012

Related U.S. Application Data

(60) Provisional application No. 61/478,000, filed on Apr. 21, 2011, provisional application No. 61/478,002, filed on Apr. 21, 2011.

(51) Int. Cl.
B62D 35/00 (2006.01)

(52) U.S. Cl.
USPC ...................................................... 296/180.4

(58) Field of Classification Search
USPC ......... 296/180.4, 180.5, 181.5, 198; 280/770, 280/849
See application file for complete search history.

(56) References Cited

U.S. PATENT DOCUMENTS

| | | |
|---|---|---|
| 2,538,839 A | 1/1951 | Limberg |
| 2,869,929 A | 1/1959 | Hurd |
| 3,078,124 A | 2/1963 | Mulder |
| 3,092,420 A | 6/1963 | Baldwin et al. |
| 3,317,247 A | 5/1967 | Lamme |
| 3,367,722 A | 2/1968 | Miyanaga |
| 3,585,824 A | 6/1971 | Schenk et al. |
| 3,874,697 A | 4/1975 | Thompson |
| 3,918,764 A | 11/1975 | Lamme |
| 3,954,281 A | 5/1976 | Juergens |
| 4,138,129 A | 2/1979 | Morris |
| 4,180,230 A | 12/1979 | Sogoian |
| 4,235,476 A | 11/1980 | Arvidsson |
| 4,334,694 A | 6/1982 | Iwanicki |
| 4,627,631 A | 12/1986 | Sherman |
| 4,706,980 A | 11/1987 | Hawes |
| 4,730,952 A | 3/1988 | Wiley |
| 4,735,428 A | 4/1988 | Antekeier |
| 4,761,040 A | 8/1988 | Johnson |
| 4,836,568 A | 6/1989 | Preslik |
| 4,889,394 A | 12/1989 | Ruspa |
| 4,921,276 A | 5/1990 | Morin |
| 4,925,235 A | 5/1990 | Fingerle |

(Continued)

FOREIGN PATENT DOCUMENTS

| | | |
|---|---|---|
| EP | 0 309 611 A1 | 4/1989 |
| EP | 0 310 130 A1 | 4/1989 |

OTHER PUBLICATIONS

Mountable Aerodynamic End Cap to Vehicle Running Boards or Steps obtained from http://www.drinkwaterts.com, printed Jul. 25, 2012, 23 pages.

(Continued)

Primary Examiner — Joseph Pape
Assistant Examiner — Dana Ivey
(74) Attorney, Agent, or Firm — Sprinkle IP Law Group

(57) ABSTRACT

Embodiments disclosed herein may be used to provide aerodynamic quarter fender assemblies. Panels may be rigidly or hingedly attached to existing quarter fenders or may be used in lieu of an existing quarter fender. Embodiments may provide improved fluid flow control across the transition zone between the tractor and the trailer, but may be easily moved into a stowed position to allow access to areas of the truck.

21 Claims, 20 Drawing Sheets

(56) References Cited

U.S. PATENT DOCUMENTS

| | | | |
|---|---|---|---|
| D312,609 S | 12/1990 | Preslik |
| D312,810 S | 12/1990 | Preslik |
| 4,974,909 A | 12/1990 | Patti et al. |
| 4,984,851 A | 1/1991 | Hayano |
| 5,190,354 A | 3/1993 | Levy et al. |
| 5,192,108 A | 3/1993 | Richardson |
| 5,257,822 A | 11/1993 | Metcalf |
| 5,263,770 A | 11/1993 | Goudey |
| 5,269,547 A | 12/1993 | Antekeier |
| 5,286,049 A | 2/1994 | Khan |
| D345,332 S | 3/1994 | Roman |
| 5,294,189 A | 3/1994 | Price et al. |
| 5,324,099 A | 6/1994 | Fitzhugh |
| 5,366,278 A | 11/1994 | Brumfield |
| 5,375,882 A | 12/1994 | Koch, III |
| D361,974 S | 9/1995 | Hornik |
| 5,490,342 A | 2/1996 | Rutterman et al. |
| 5,623,777 A | 4/1997 | Hsiao et al. |
| D381,949 S | 8/1997 | Barrett |
| 5,659,989 A | 8/1997 | Hsiao et al. |
| D395,268 S | 6/1998 | Tucker |
| 5,791,741 A | 8/1998 | Sheu |
| 5,833,254 A | 11/1998 | Bucho |
| 5,836,399 A | 11/1998 | Maiwald et al. |
| 5,850,727 A | 12/1998 | Fox |
| 5,871,335 A | 2/1999 | Bartlett |
| 5,884,981 A | 3/1999 | Ichikawa |
| 5,938,222 A | 8/1999 | Huang |
| 5,947,520 A | 9/1999 | McHorse |
| 6,045,195 A | 4/2000 | Okamoto |
| 6,070,893 A | 6/2000 | Thorndyke |
| 6,070,908 A | 6/2000 | Skrzypchak |
| 6,120,104 A | 9/2000 | Okamoto et al. |
| 6,152,469 A * | 11/2000 | Gadowski ............... 280/154 |
| 6,219,987 B1 | 4/2001 | Trent |
| 6,367,841 B1 | 4/2002 | Matthew |
| 6,412,799 B1 | 7/2002 | Schrempf |
| 6,431,605 B1 | 8/2002 | Miller |
| 6,435,462 B2 | 8/2002 | Hawes |
| 6,443,492 B1 | 9/2002 | Barr et al. |
| 6,648,373 B2 | 11/2003 | Hawes |
| 6,666,498 B1 * | 12/2003 | Whitten ............... 296/180.4 |
| 6,786,512 B2 | 9/2004 | Morin |
| 6,857,709 B1 | 2/2005 | Mclean et al. |
| 6,886,862 B2 | 5/2005 | Matthew |
| 6,979,050 B2 * | 12/2005 | Browne et al. ........... 296/180.5 |
| 7,081,081 B2 | 7/2006 | Schütz et al. |
| 7,083,179 B2 | 8/2006 | Chapman |
| 7,131,705 B1 | 11/2006 | Delvecchino et al. |
| 7,249,804 B2 | 7/2007 | Zank et al. |
| 7,484,736 B2 | 2/2009 | Allemann et al. |
| 7,520,534 B2 | 4/2009 | Longchamp |
| 7,547,076 B2 | 6/2009 | Necaise |
| 7,775,604 B2 | 8/2010 | Chen |
| 7,806,464 B2 | 10/2010 | Cardolle |
| 7,909,343 B2 | 3/2011 | Archer et al. |
| 7,931,302 B2 | 4/2011 | Vaughn |
| 8,011,848 B2 | 9/2011 | Sockman et al. |
| 8,251,436 B2 | 8/2012 | Henderson et al. |
| 8,342,595 B2 | 1/2013 | Henderon et al. |
| 2009/0273176 A1 | 11/2009 | Ulgen |
| 2010/0066123 A1 | 3/2010 | Ortega |
| 2010/0066155 A1 | 3/2010 | Seradarian et al. |
| 2010/0117396 A1 * | 5/2010 | Dayton ............... 296/180.1 |
| 2011/0057410 A1 | 3/2011 | Eklund |
| 2011/0089748 A1 | 4/2011 | Grill et al. |
| 2011/0101767 A1 | 5/2011 | Fleck |
| 2012/0013146 A1 * | 1/2012 | Wolf et al. ............... 296/180.5 |
| 2013/0015698 A1 | 1/2013 | Butler et al. |
| 2013/0049320 A1 | 2/2013 | Smith |
| 2014/0117712 A1 | 5/2014 | Butler et al. |

OTHER PUBLICATIONS

Council Hitch Truck Accessories, obtained from http://councilhitch.com, printed Jul. 24, 2012, 1 page.
AMP Research Power Step™ obtained from www.amp-research.com, printed Jul. 24, 2012, 6 pages.
TrailBack Aluminum Running Boards obtained from www.buyautotruckaccessories.com, printed Jul. 24, 2012, 2 pages.
Discount Auto Parts Dee Zee Running Boards Car Truck SUV obtained from www.running-board.nedona.org, printed Jul. 24, 2012, 6 pages.
Lund Trailrunner Extruded Aluminum Running Boards, obtained from www.jcwhitney.com, printed on Jul. 25, 2012, 3 pages.
Endeavor Running Boards, obtained from http://4wheelonline.com, printed Jul. 28, 2012, 2 pages.
Deflecktor, The First-Of-Its-Kind Aerodynamic Wheel Cover web site pages, 15 pgs., A de F, Ltd. Headquarters, Birchwood, MN, at http://www.deflecktor.com/DeflecktorBrochure.pdf.
International Search Report and Written Opinion issued for PCT Application No. PCT/US2012/046010, completed Sep. 11, 2012 and mailed Oct. 1, 2012, 10 pgs.
International Preliminary Report on Patentability (Ch. I) for PCT Application No. PCT/US2012/046010, mailed Jan. 23, 2014, 9 pgs.
International Search Report and Written Opinion for International Patent Application No. PCT/US/68119, mailed Jun. 5, 2014, 10 pgs.
Isuzu Splash Shield/Mud Flap #1577, Product Information Page (online), Busbee's Trucks & Parts, 2009-2012 [retrieved on Feb. 25, 2014] at <<http://www.busbeetruckparts.com/truck-part-categories/splash-shields/isuzu-npr-splash-shieldmud-flap-1989-used>>, 1 pg.

* cited by examiner

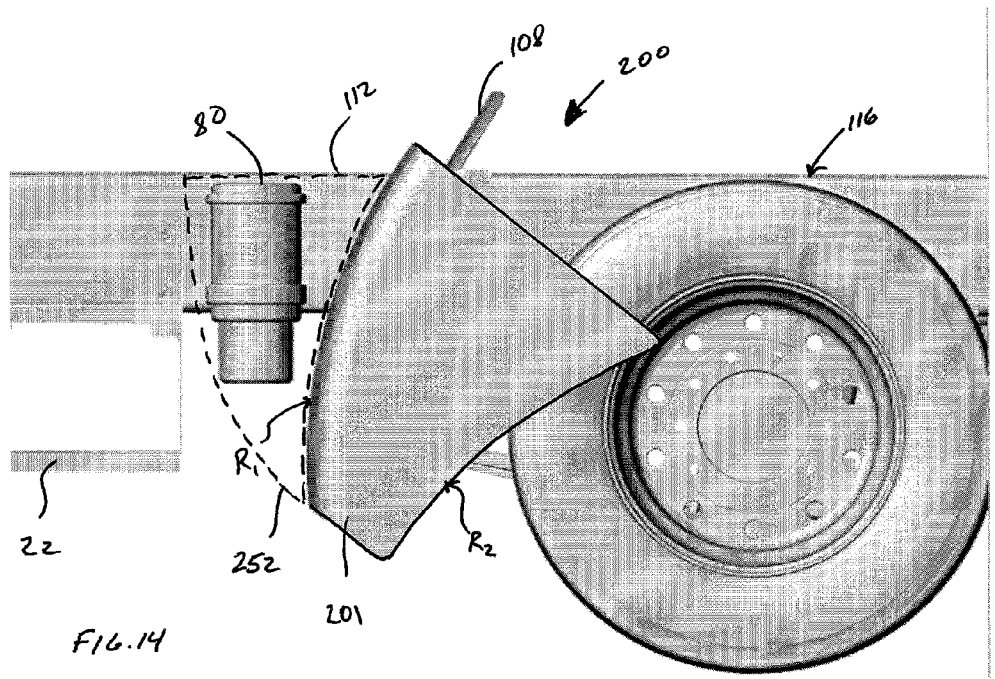
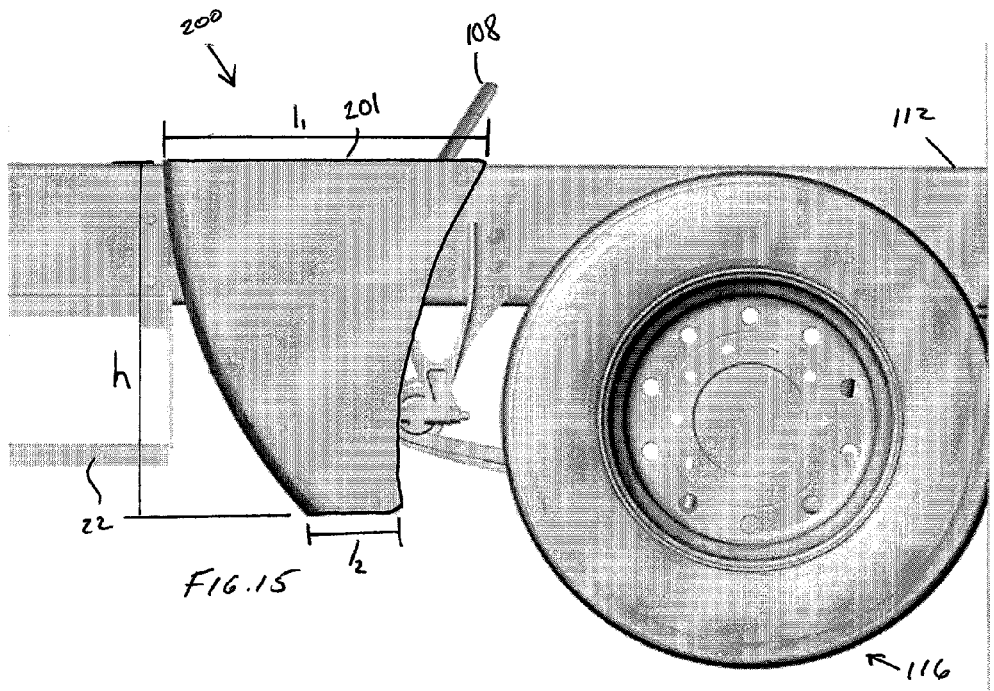

Plausible Deflected Position

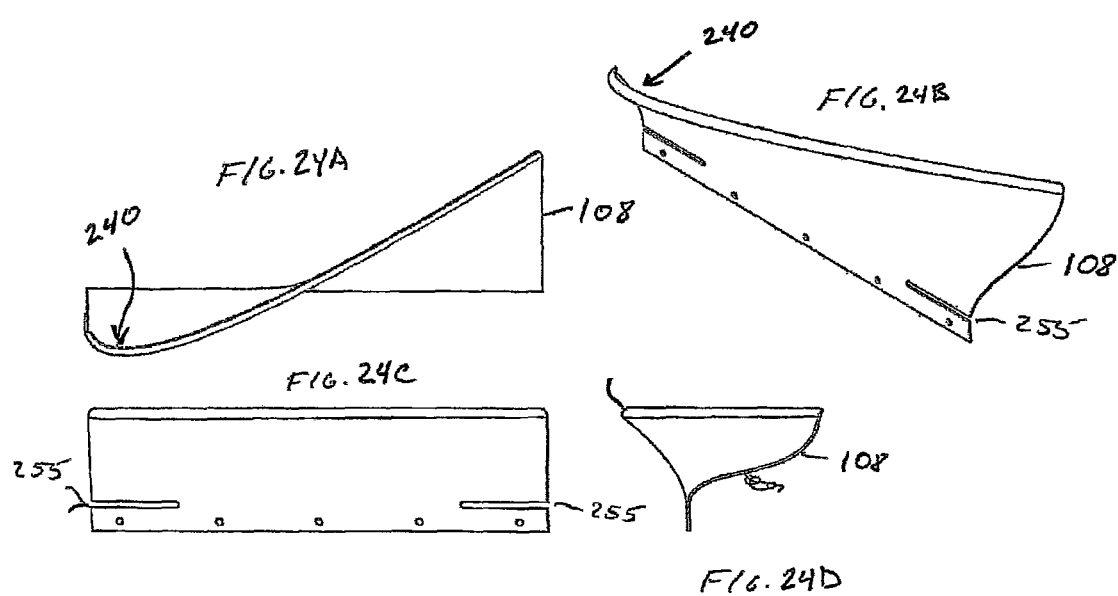

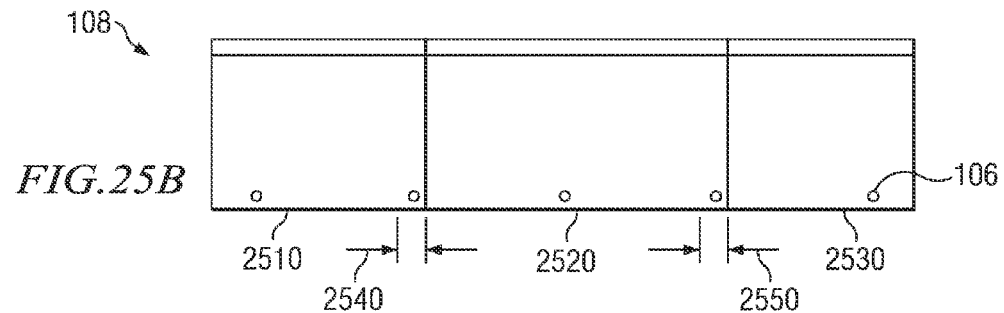
FIG. 25B
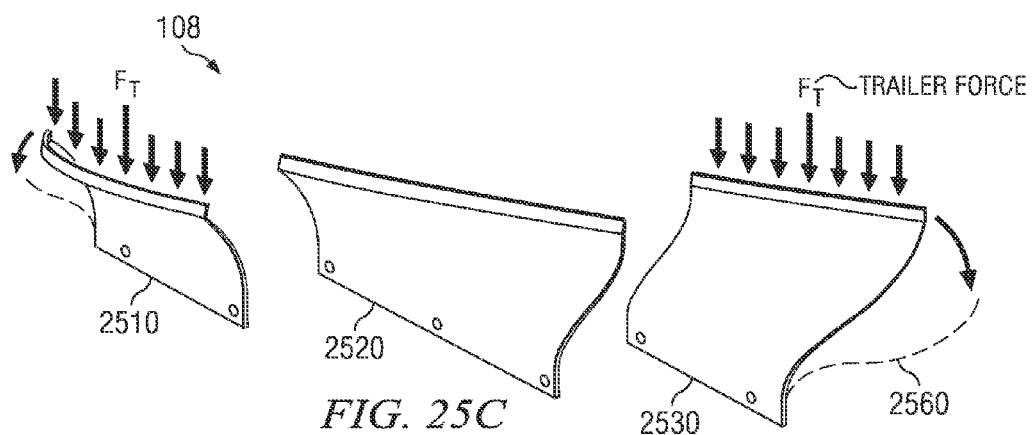
FIG. 25C
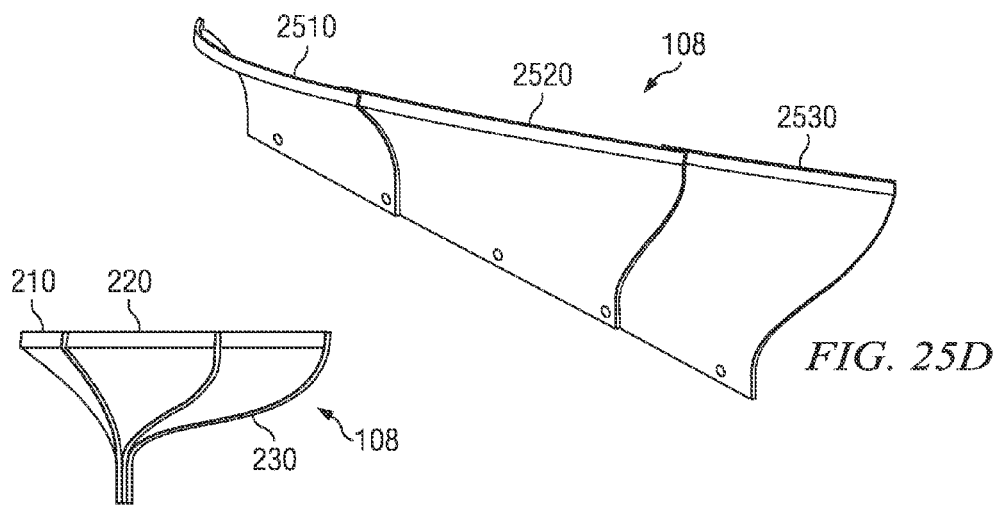
FIG. 25D
FIG. 25E

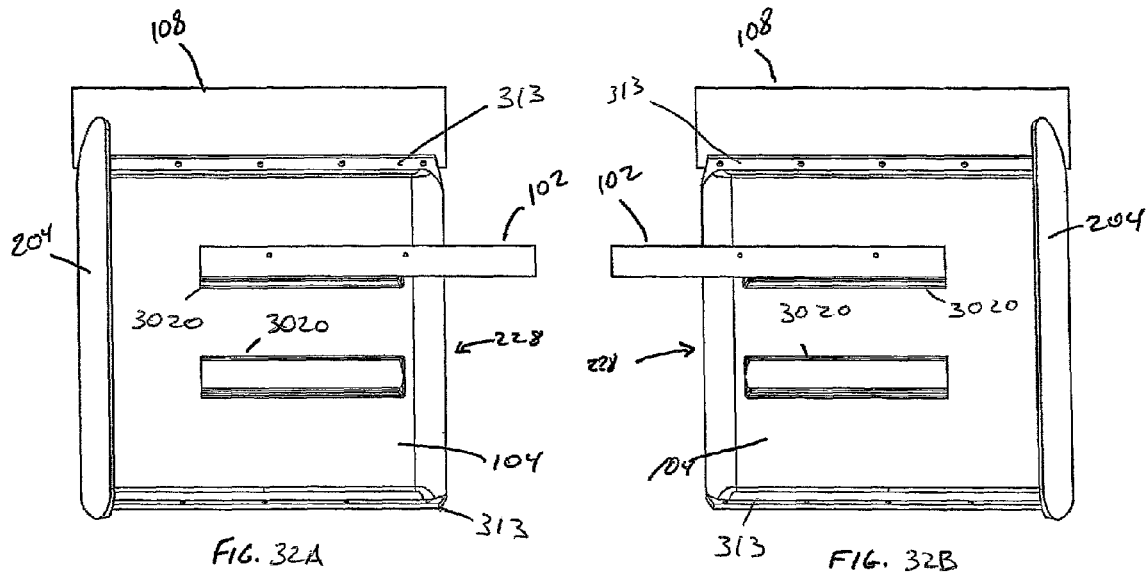
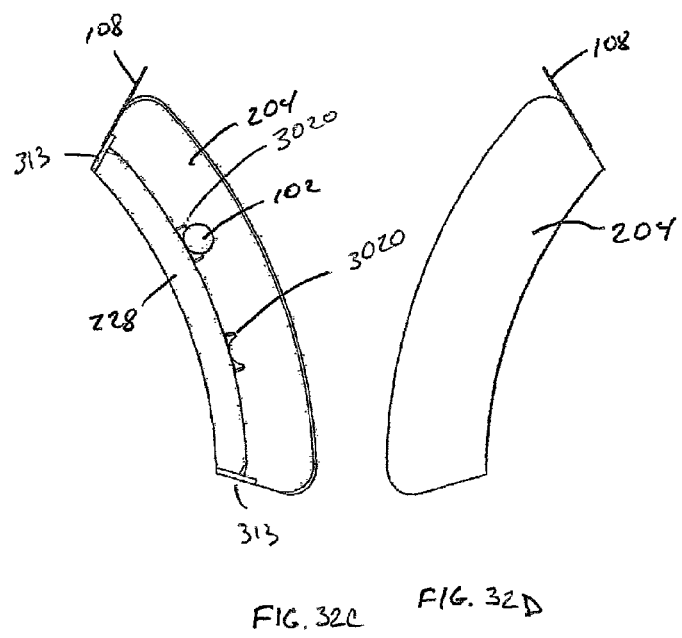
FIG. 32A  FIG. 32B
FIG. 32C  FIG. 32D

AERODYNAMIC QUARTER FENDER ASSEMBLY AND CONSTRUCTION METHOD

RELATED APPLICATIONS

This application claims a benefit of priority to the filing date of U.S. Provisional Patent Application Ser. No. 61/478,000 by Joshua Butler, Kyle Walker and Bruce Lee, entitled "Aerodynamic Quarter Fender and Construction Method" filed on Apr. 21, 2011, and U.S. Provisional Patent Application Ser. No. 61/478,002 by Joshua Butler, Kyle Walker and Bruce Lee, entitled "Aerodynamic Quarter Fender Deflector Flap and Method of Making Same" filed on Apr. 21, 2011, which are fully incorporated herein by reference for all purposes.

TECHNICAL FIELD

This disclosure relates to methods of constructing quarter fender assemblies and quarter fender accessories for land vehicles, especially tractor-trailers, with improved aerodynamics (reduced drag, improved stability, reduced splash/spray) and with improved usability, functionality, robustness, cost-effectiveness, and appearance.

BACKGROUND

A quarter fender is typically affixed to each outer side of the frame rails of a vehicle (especially a semi-tractor) in front of a set of non-steered wheels (including single wheels, double wheels, and wheels in tandem), such that the tires are protected from foreign objects, the cab is protected from impact by any forward-propelled splash/spray/debris from the rotating wheels, and some protection from tire damage is provided to surrounding equipment in the event of a blowout. In addition, quarter fenders may provide some aesthetic purpose.

The shape and orientation of a quarter fender is generally based on preventing rocks from striking the cab, contact (or no contact) with a trailer, and ensuring a driver or mechanic can access parts on the tractor chassis. They typically have a general curvature with respect to a proximal wheel.

FIG. 1 depicts a perspective view of a standard quarter fender 100 having mounting pipe 102 and clamp 110 coupled to deflector flap 108 using fasteners 106. Existing quarter fenders 100 typically mount forward of the tractor's non-steered wheel assemblies 116, and are pivotal about the mounting pipe 102 such that the user can adjust quarter fender 100 to best seal a gap between the truck and the trailer or to obtain a desired appearance, for example. A quarter fender deflector flap typically mounts to the top of the quarter fender using nuts and bolts, for example, and is a substantially flat, flexible piece of plastic or rubber, sometimes with a particular 2-dimensional cutout pattern, graphic, or texture.

FIGS. 2 and 3 depict partial perspective and partial side views of a tractor 60 coupled to a trailer 120 constituting a tractor-trailer combination vehicle. FIGS. 2 and 3 further illustrate standard quarter fender 100 installed on tractor 60, whereby quarter fender 100 comprises mounting pipe 102 connected to quarter fender panel 100 with mounting hardware 106. Quarter fender 100 typically receives a deflector flap 108, which may be secured with mounting hardware 106. Quarter fender 100 is typically mounted to the tractor with mounting pipe 102 connecting to mounting stud (not shown) and secured with clamp 110 to the stud, which is typically permanently affixed to frame rail 112 or sometimes to suspension bracket 114, or other bracket. FIG. 3 further depicts a gap 122 commonly found between trailer 120 and flap 108.

FIG. 4 depicts a perspective view of quarter fender 100 installed on a vehicle. As shown in FIG. 4, there are usually components, for example steps 22, cylinder 80, that should be readily accessible for servicing, inspecting etc. Thus, quarter fenders 100 typically do not extend into this space. In some cases, a fuel tank fairing or other body component of the vehicle may extend into this space, thereby reducing or eliminating this space.

One problem with quarter fenders is the inability to properly align the quarter fender with the tire, trailer, etc. to achieve a desired air flow, minimize spray/splash or debris, or prevent rocks and debris from being propelled back toward the cab. As a result of the inability to accurately and consistently position or orient a quarter fender, the air flow may be asymmetric, may increase spray, splash, or aerodynamic drag, may not protect against blowouts, and other undesirable outcomes.

Additional problems exist for quarter fenders that have deflector flaps designed to contact the trailer such that no gap exists between the trailer and the top of the quarter fender. For example, deflector flaps are frequently impacted by the bottom of a trailer when the trailer is being loaded or unloaded from the tractor. Depending on the position of the flap, the trailer may contact and affect the flap. As a result, the thickness and material of many existing flaps are designed to deflect easily out of the way under a vertical load. But many times they are subjected to awkward loading by the trailer and may buckle, fail catastrophically, deform inelastically, or otherwise fail over time. These deflector flaps are manufactured with a planar surface and angled either forward or backward to reduce damage from contact with the trailer.

SUMMARY

Quarter fenders on the market or in the prior art do not appear to have any significant aerodynamic features except that some have flattened mounting pipes, and some with mounting pipes on the inside of the quarter fender to maintain a smooth exterior, and some more rounded to the sides than others—but typically having only a 1" radius or less to provide rigidity to the quarter fender. There exist quarter fenders with bolt-on reflectors/bristles, but no aerodynamic attachments or integrated aerodynamic features. Existing and prior art deflector flaps are all substantially planar—some may have cutouts on the sides, or rounded edges, but the flap itself has thickness of ½" at most.

Embodiments disclosed herein may be directed to an aerodynamic quarter fender panel with a surface to control or direct air flow outside the wheels of a vehicle. A quarter fender assembly may have a quarter fender panel with a front portion and a rear portion. The front portion may be shaped or oriented to direct airflow outward relative to the vehicle. The front portion itself may be configured for inward deflection to provide better access to components on the truck or trailer. The rear portion may also be configured to deflect or direct airflow outward relative to the vehicle, and may have a higher stiffness to enable the rear portion to support the front portion.

A quarter fender assembly may be formed for coupling with an existing quarter fender or may be formed independent or instead of an existing quarter fender. A quarter fender assembly may be configurable or positionable in a retracted position for improved access to other elements on a vehicle, or in a deployed position to deflect or direct airflow around elements on the vehicle. Movement between a retracted position and a deployed position may be possible by way of a hinge, one or more arms, or material having resilient characteristics.

A quarter fender panel may have a selected geometric shape. A geometric shape of a quarter fender panel may be based on a shape of an attached quarter fender deflector flap.

Embodiments disclosed herein provide new methods of reducing aerodynamic drag, reducing splash, spray, and debris from rotating wheels, and for improving the reliability of a deflector flap under severe, awkward, and long-term loading for a vehicle equipped with a fender, such as a quarter fender, which accommodates a deflector flap.

Embodiments disclosed herein address the problem associated with debris projected forward by the rotating wheels of a vehicle that may strike and continue forwardly or laterally from the rear surface of the deflector flap by providing a debris "catch" that helps prevent debris striking the rear surface of the flap from continuing in a forward or lateral direction.

Embodiments disclosed herein further address the need for reducing aerodynamic drag and thus increasing vehicle efficiency by demonstrating new methods of constructing aerodynamic deflector flaps. In some embodiments, the outermost edge of the deflector flap transitions rearward by at least 1" to accommodate aerodynamic features such as a radius, chamfer, curvature, ribs, etc. In one embodiment, a deflector flap has the functionality and an appearance similar to that of the rounded front vertical edges of a modern trailer. In some embodiments, the innermost edge may protrude forward to force air flow to the sides of the vehicle, thereby reducing aerodynamic drag experienced by momentous airflow entering the underbody area, where the suspension and other underbody components are located. Embodiments disclosed herein further address the problems associated with deflector flap loading by the trailer by providing first a crushable cross-sectional profile.

Embodiments disclosed herein further disclose a two-piece and three-piece deflector flap to obtain preferable loading and thus deflection of each section of the flap, at least partially independent of the others. The two-piece and three-piece deflector flap may advantageously decrease the likelihood of undesirable loading by the trailer bottom, and permit the deflection of curved portions of the flaps under such loads where otherwise they may fail or deform inelastically.

In another broad respect, embodiments disclosed herein may be directed to a method for manufacturing a quarter fender panel or quarter fender assembly. The method may include forming a quarter fender panel having two or more pipe mounting sections 3020 and two or more deflector flap mounting sections 313 which are approximately symmetric across a center line. The method may include selecting a pipe mounting section and a deflector flap mounting section based on a side of the vehicle on which the quarter fender assembly is to be used. A mounting pipe can be coupled to the selected pipe mounting section and a deflector flap can be coupled with the selected deflector flap mounting section to form a quarter fender assembly that is asymmetric about a center line.

BRIEF DESCRIPTION OF THE DRAWINGS

FIGS. 14-17 depict side and top views of one embodiment of a quarter fender assembly having a hinged portion;

FIGS. 24A-24D depict top perspective, front and side views of one embodiment of a multiple piece deflector flap;

FIGS. 25A-25E depict graphical cross-sections of embodiments of a quarter fender assembly with a leading edge;

FIGS. 31 and 32A-32D depict front and side views of one embodiment of an asymmetric quarter fender assembly.

DETAILED DESCRIPTION

Figure 4:
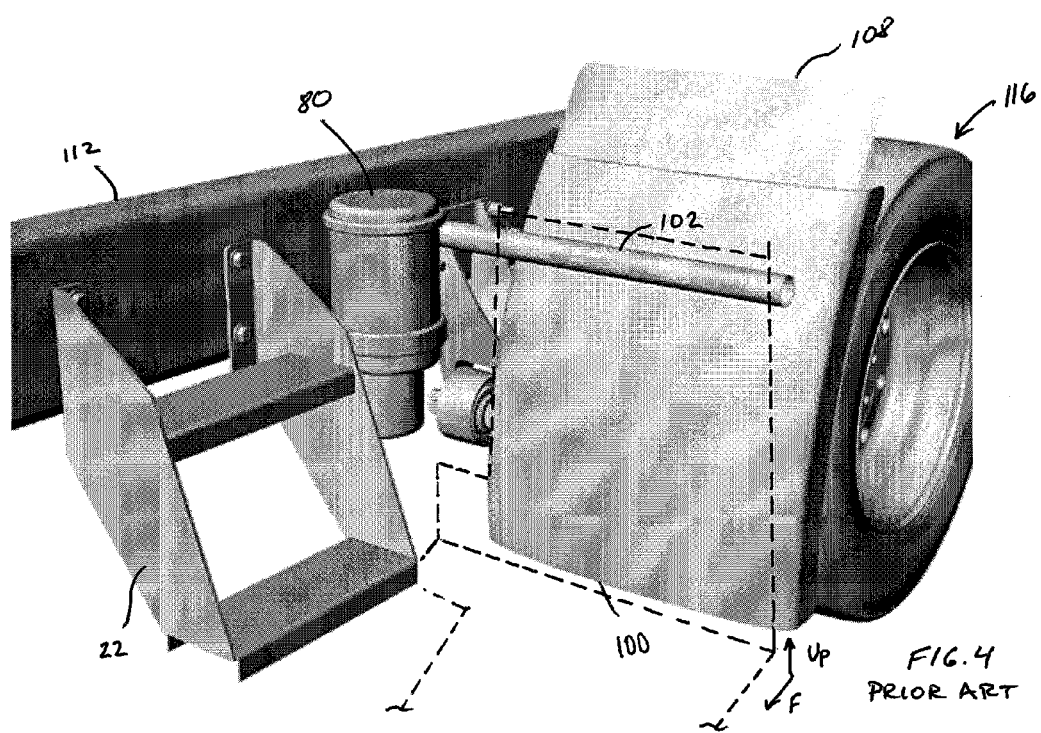
FIG. 4 depicts a partial perspective view of a large vehicle, illustrating unoccupied volumes commonly located in front of a quarter fender.

The disclosure and various features and advantageous details thereof are explained more fully with reference to the exemplary, and therefore non-limiting, embodiments illustrated in the accompanying drawings and detailed in the following description. Descriptions of known starting materials and processes may be omitted so as not to unnecessarily obscure the disclosure in detail. It should be understood, however, that the detailed description and the specific examples, while indicating the preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus. Further, unless expressly stated to the contrary, "or" refers to an inclusive "or" and not to an exclusive "or." For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead these examples or illustrations are to be regarded as being described with respect to one particular embodiment and as illustrative only. Those of ordinary skill in the art will appreciate that any term or terms with which these examples or illustrations are utilized encompass other embodiments as well as implementations and adaptations thereof which may or may not be given therewith or elsewhere in the specification and all such embodiments are intended to be included within the scope of that term or terms. Language designating such non-limiting examples and illustrations includes, but is not limited to: "for example," "for instance," "e.g.," "in one embodiment," and the like. Furthermore, any dimensions, materials or other such characteristics are provided by way of example and not limitation. Also, relational descriptions (e.g., inward, outward, higher than, lower than, below, above, in front of, in back of, etc.,) may be used to better describe embodiments disclosed herein, Large vehicles typically have three or more axles. Each axle may have a wheel assembly on each side comprising one or two wheels. Air flow outside or inside a wheel assembly, as well as air flow between wheels results in drag that negatively affects fuel efficiency of the vehicle. Embodiments disclosed herein may be particularly useful for deflecting or otherwise directing fluid flow, such as air flow, around components of large vehicles to reduce drag, reduce or otherwise control the generation, direction or distribution of spray/splash, improve the stability of large vehicles in an airstream, etc. Embodiments disclosed herein may be manufactured as single or multiple piece construction.

Quarter fender assemblies may be attached to or coupled with a frame on a large vehicle. The placement of a quarter fender assembly may be based on the proximity to other components, such as wheels, suspension components, brake components, hydraulic lines, tools or tool boxes, spare tires, and the like. The placement of a quarter fender assembly may also be based on providing access to components or to a portion of the frame.

The configuration of a quarter fender assembly may be selected to provide access to a selected component. A configuration may include providing a hinge or other rotatable coupling to allow the quarter fender assembly or portions thereof to rotate or otherwise retract to allow access and to deploy to provide an aerodynamic surface for directing air flow around components.

Figure 5:
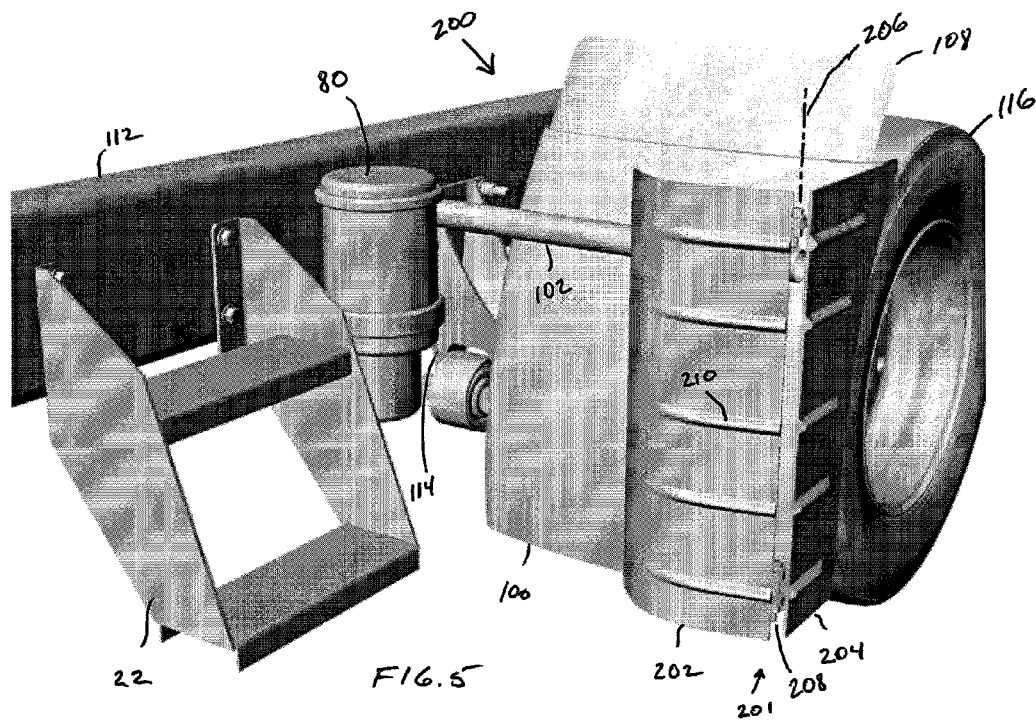
FIGS. 5-10 depict partial perspective, top and side views of one embodiment of a quarter fender assembly having a hinged portion.
Figure 6:
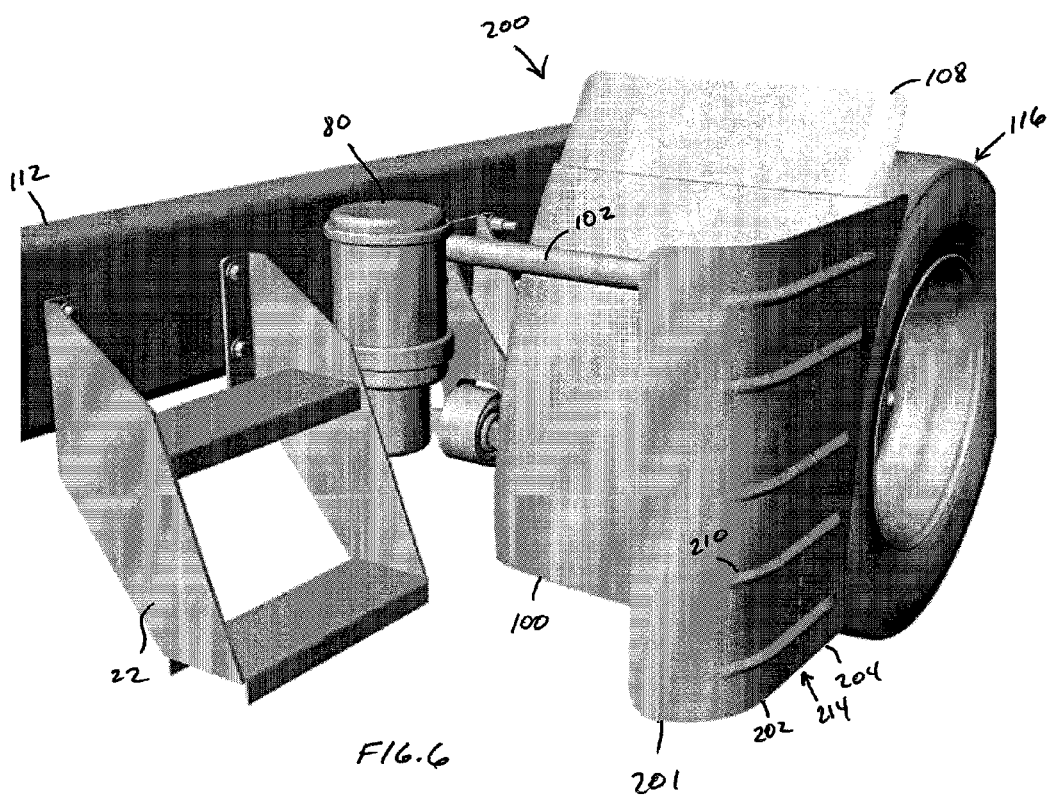
Figure 7:
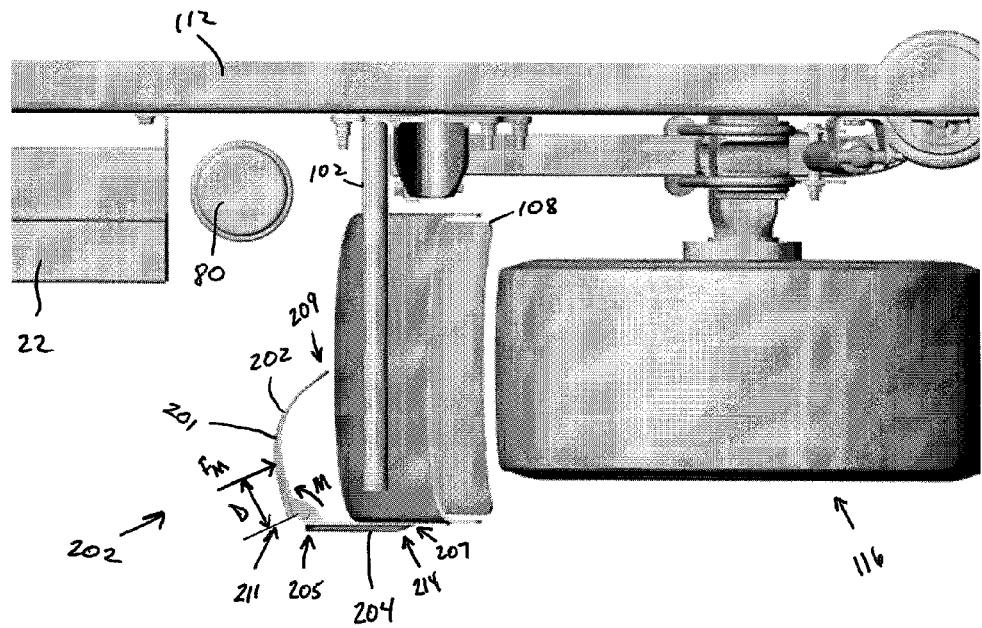
Figure 8:
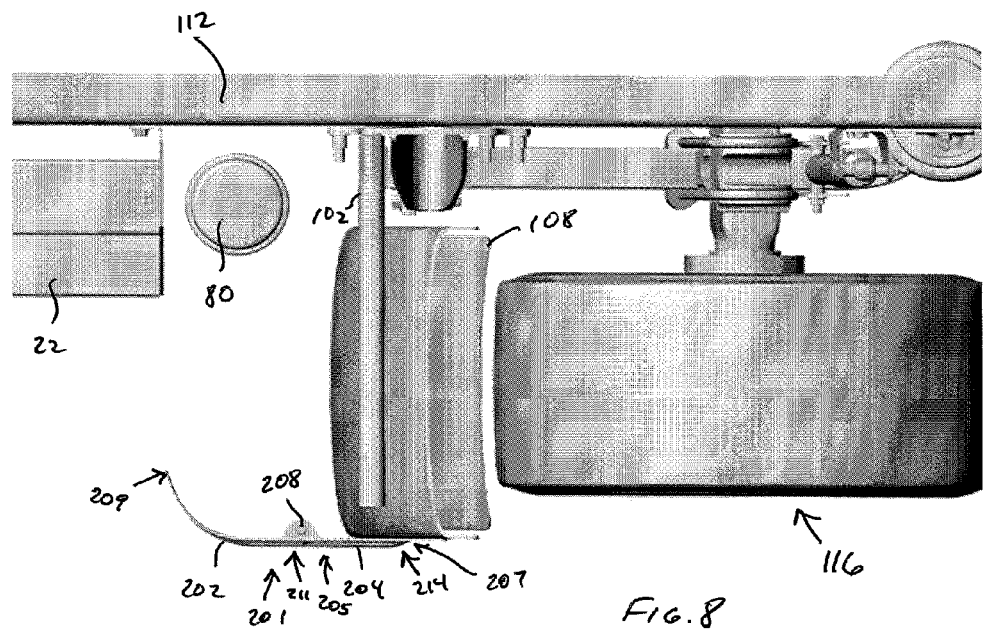
Figure 9:
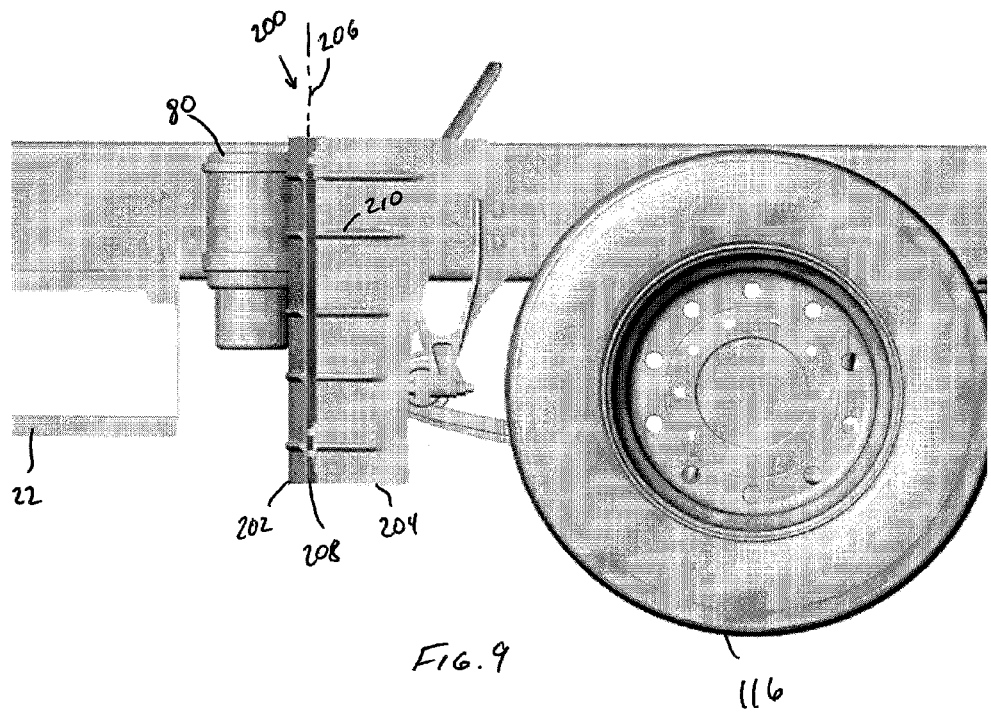
Figure 10:
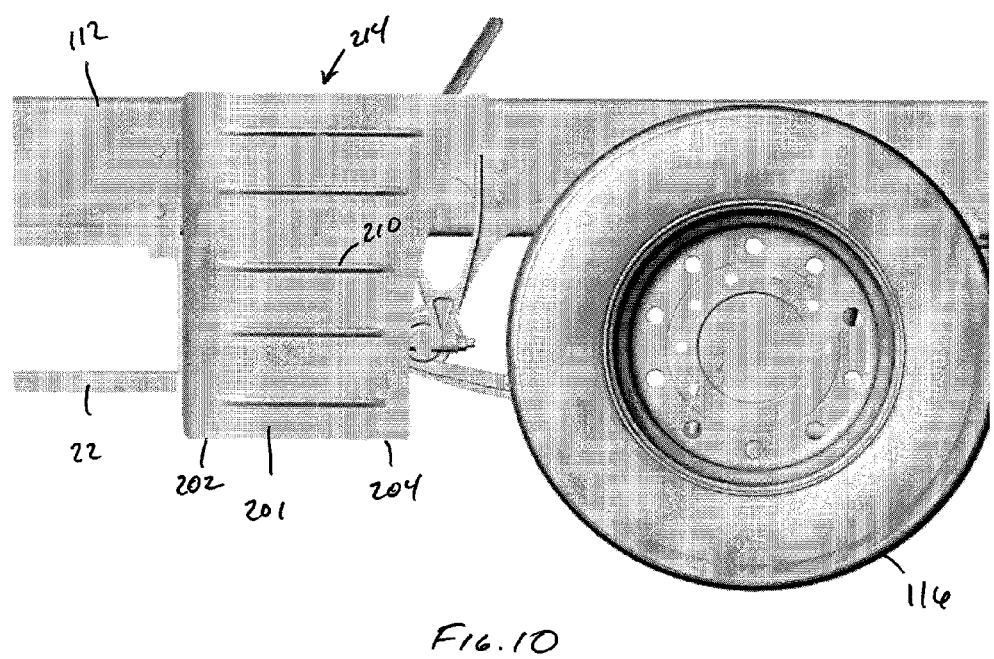

To provide additional context it may be helpful to refer to illustrations of various embodiments of quarter fender assemblies. In some embodiments, a quarter fender assembly may include a quarter fender panel having portions that can be stowed to provide access to components on a truck or trailer. FIGS. 5, 7 and 9 provide perspective, top and side views of one embodiment of a quarter fender assembly in a retracted position while FIGS. 6, 8 and 10 provide perspective, top and side views of the embodiment in a deployed position. In the example of FIGS. 5-10, the quarter fender assembly 200 comprises an add-on structure that can be added in addition to an existing quarter fender 100.

Quarter fender assembly 200 comprises quarter fender panel 201 having forward portion 202 and rear portion 204 joined about an axis 206 formed by hinges 208. Rear portion 204 may be joined to an existing quarter fender 100 at interface 214. Embodiments disclosed herein may use mechanical, chemical or thermal processes to couple rear portion 204 to quarter fender 100. In one embodiment, a quarter fender edge may be configured to receive an extrusion or other part of quarter fender 100. Quarter fender 100 may slide onto the extrusion. Coupling between rear portion 204 and quarter fender 100 may be reversible or irreversible. Rear portion 204, according to one embodiment, may include a front edge 205 and a rear edge 207. Forward portion 202 may similarly include a front edge 209 and a rear edge 211. Preferably, the rear edge 211 of front portion 202 abuts or is close to the front edge 205 of rear portion 204 when the quarter fender assembly 200 is in a deployed position so that the outer surface 215 of front portion 202 and the outer surface 217 of rear portion 204 form a continuous outer surface from a fluid flow perspective (that is, a surface to which flow can remain attached even if there is a small gap between front portion 202 and rear portion 204).

In the embodiment of FIGS. 5-8, rear portion 204 is oriented so that its outer surface is approximately parallel to and outboard of an outer plane of the wheel assembly. In other cases, however, rear portion 204 may be angled or curved inward toward frame rail 112.

The outer surface of forward portion 202 may be formed so that the front edge of forward portion 202 is more inboard than the rear edge of rear portion 204, such that air flow is generally directed outward. According to one embodiment, the outer surface of forward portion 202 has a simple geometry, such as having a substantially flat or a simple angled or curved geometric shape. In other embodiments, the outer surface of forward portion may have a complex geometry, such as having varying radii of curvature, inflection points or asymmetric features. Because the leading edge is more inboard and forward than the trailing edge and the front and rear portions form a continuous aerodynamic surface, air contacting the surface of the forward portion will be directed outward along the surface, along the outer surface of the rear portion to the outside of the wheel assembly (or other components).

In addition to generally having a surface for deflecting airflow, embodiments disclosed herein may include additional features useful for directing air around components. In some embodiments, forward portion 202 and rear portion 204 have ribs 210 disposed on the outer surfaces to direct air flow. As shown in FIGS. 5-6, ribs 210 may be oriented based on an anticipated direction of travel of the vehicle. In other embodiments, ribs may be oriented at different angles. Orienting ribs 210 at selected angles may help to control airflow around selected components, to reduce spray, etc. Ribs 210 may also be used for stiffening forward portion 202 or rear portion 204, which may enable quarter fender assembly 200 to be manufactured with less weight but still provide improved aerodynamic flow.

Forward portion 202 may be able to rotate about an axis 206 relative to rear portion 204. Rotation may be made possible by a rotatable coupling, such as a hinge 208, which may include a hinge pin, a living hinge mechanism, or the like. In some embodiments, rotation may be offset or resisted by a resilient member. Torsion springs, compression springs, or compression springs may be useful for biasing quarter fender assembly 200 in a deployed configuration. Hinge 208 may define the location of hinge axis 206. In some embodiments, the size of rear portion 204, the location of axis 206, the length L of forward portion 202 or the degree to which forward portion 202 can rotate about axis 206 may be based on the need to access selected components such as cylinder 80 or the need to direct air flow away from component 80.

As depicted in FIG. 7, a hinge moment M provided by a spring or other resilient member may operate in a rotational direction about hinge axis 206 to bias forward portion 202 into a deployed position. In some embodiments, the spring or other biasing force may be such that forward portion 202 can be pushed inward by a mechanic, for example, with a force, $F_m$, applied at a distance D from the hinge axis 206 sufficient to supply a torque greater than the hinge moment M. Pivoting forward portion 202 inward about axis 206 to its retracted position may be advantageous for obtaining additional space or maximizing the usable volume of space for repairs etc., while the vehicle is stationary. When force $F_m$ is no longer applied to the forward portion 202 (or the torque applied is less than the hinge moment M), forward portion 202 may return to and remain in its deployed position to provide an extended surface which may advantageously provide less drag for improved aerodynamics when in motion. In some embodiments, hinge mechanism 208 may also provide a dampening mechanism, a locking/latching mechanism, or accommodate additional modifications that may improve the rigidity or operation of hinge mechanism 208. A locking mechanism may be provided to reduce the likelihood of aerodynamic forces undesirably operating hinge mechanism 208 while the vehicle is in motion. In some cases, such a locking mechanism may be provided in lieu of a spring or biasing member. A locking mechanism may also be provided so that forward portion 202 can remain in the retracted position (e.g., during repairs or the like).

Figure 11:
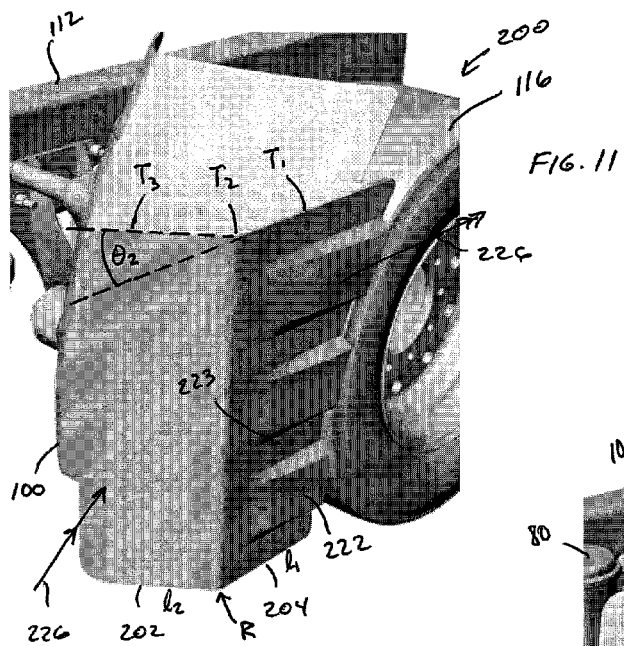
FIGS. 11-13 depict partial perspective views of other embodiments of quarter fender assemblies.

FIG. 11 depicts one embodiment of quarter fender panel 201 in which forward portion 202 is coupled to rear portion 204, which may be rotatably or fixedly coupled to other components to form quarter fender assembly 200. Quarter fender panel 201 may have sections of varying thickness. Quarter fender panel 201 of FIG. 11, for example, comprises three sections of varying thicknesses ($T_1$, $T_2$, $T_3$). In some embodiments, quarter fender panel 201 may include forward portion 202 with thickness $T_1$ and length $L_1$ transitioning via section 224 having thickness $T_2$ to rear portion 204 with thickness $T_3$. Quarter fender panel 201, as shown in FIG. 11, may be formed as a one-piece molded panel with forward portion 202 transitioning to rear portion 204 at a bend with radius R.

Forward portion 202 may be angled inward at angle $\theta_2$ relative to rear portion 204 to receive high-momentum airflow 226 that would otherwise impact surfaces of a typical quarter fender in a substantially normal direction, thereby maintaining more attached and higher momentum airflow along the outside surface of the quarter fender panel 201 and thus reducing pressure drag of the quarter fender panel 201 or quarter fender assembly 200.

Directing air flow may further include channeling air flow along selected paths. For example, rear portion 204 may be shaped to include a series of ducts 222 that are open to inside of quarter fender panel 201 and rear of quarter fender panel 201. The outer surfaces of ducts 222 create generally horizontal channels 223 in between ducts 222 to direct air. In addition to providing a structure that forms channels 223, ducts 222 may be shaped to evacuate or equalize the pressure of residual airflow on the inside of the fairing with the outside airflow.

Ducts 222 may be of equal dimensions, or may be sized differently to direct greater air flow along a desired path. For example, more air flow may be directed along a desired path to cool a component, to reduce spray and debris, etc. The dimensions of duct 222 may be selected to provide a desired acceleration or momentum of air flow as well.

Figure 12:
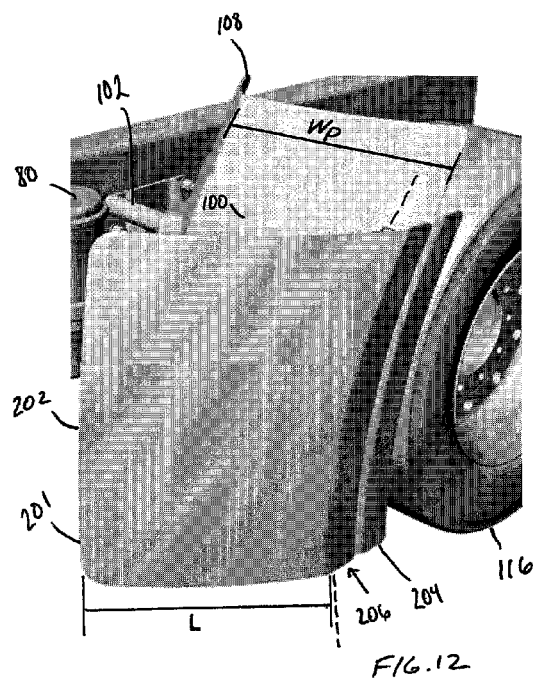

In some embodiments, a hinge axis may be in either forward portion 202 or rear portion 204. FIG. 12 shows a perspective view of one embodiment of a quarter fender panel 201 having forward portion 202 with a first curvature and rear portion 204 including discontinuous hinge axis 206. The length L of forward portion 202 is preferably less than or equal to the fender width $W_f$ of quarter fender panel 201. When quarter fender assembly 200 is pivoted into its fully retracted position, the fairing may occupy minimal volume, similar to two standard quarter fenders if they were stacked.

Further, although quarter fender assembly 200 may be shown in a preferable operating position and geometry, other orientations and dimensions can be preferable depending on the geometric constraints of the particular vehicle and needs of the particular user.

Figure 13:
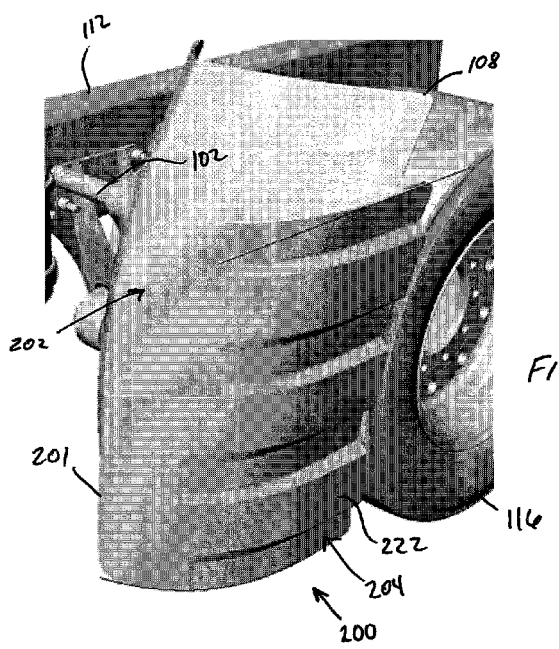

As discussed above, embodiments disclosed herein may be useful for directing flow around components on a large vehicle. Directing air flow may comprise generalized air flow around a component, or may involve channeling air flow along a desired path. FIG. 13 shows a perspective view of one embodiment of quarter fender panel 201 formed as a single piece with a selected curvature and having aerodynamic ducts 222 and channels 223. In one embodiment, quarter fender panel 201 may be constructed of flexible plastic to permit deflection that may provide additional space when deflected.

In some embodiments, quarter fender assemblies 200 may be rotatable about a horizontal axis. A horizontal axis of rotation may be located near the bottom (i.e., a bottom-hinged axis), near the top (i.e., a top-hinged axis), near the middle (i.e., a center-hinged axis) or at points in between to allow access to selected components, to provide sufficient clearance for a trailer, or the like. FIGS. 14 and 15 depict side views of one embodiment of a bottom-hinged quarter fender panel in retracted and deployed positions respectively. The fairing and fender may be essentially stacked when the fairing is retracted as shown.

As shown in FIGS. 14 and 15, rear portion 204 may have a front edge with a front radius $R_1$ and a rear edge with a rear radius $R_2$. Front portion 202 can be curved to match radius $R_1$. The selection of $R_1$ and $R_2$ may be to obtain preferable aesthetics in both deployed and retracted positions, or to provide access or a desired usable space when in a retracted position. $R_1$ may also be selected to provide a desired air flow. Furthermore, second portion 204 may have height h, top length $l_1$ and bottom length $l_2$, with lengths $l_1$ and $l_2$ chosen to extend past the location of the position associated with a typical quarter fender 100. This can provide an extended surface for attached airflow in the direction of these lengths prior to separating from the rearward edge with radius $R_2$.

When quarter fender assembly 200 is deployed, components may be shielded from spray, airflow, debris etc. When quarter fender assembly 200 is retracted, space (indicated by dashed lines and referred to as side space area 252) may be created to allow access to various components.

Figure 16:
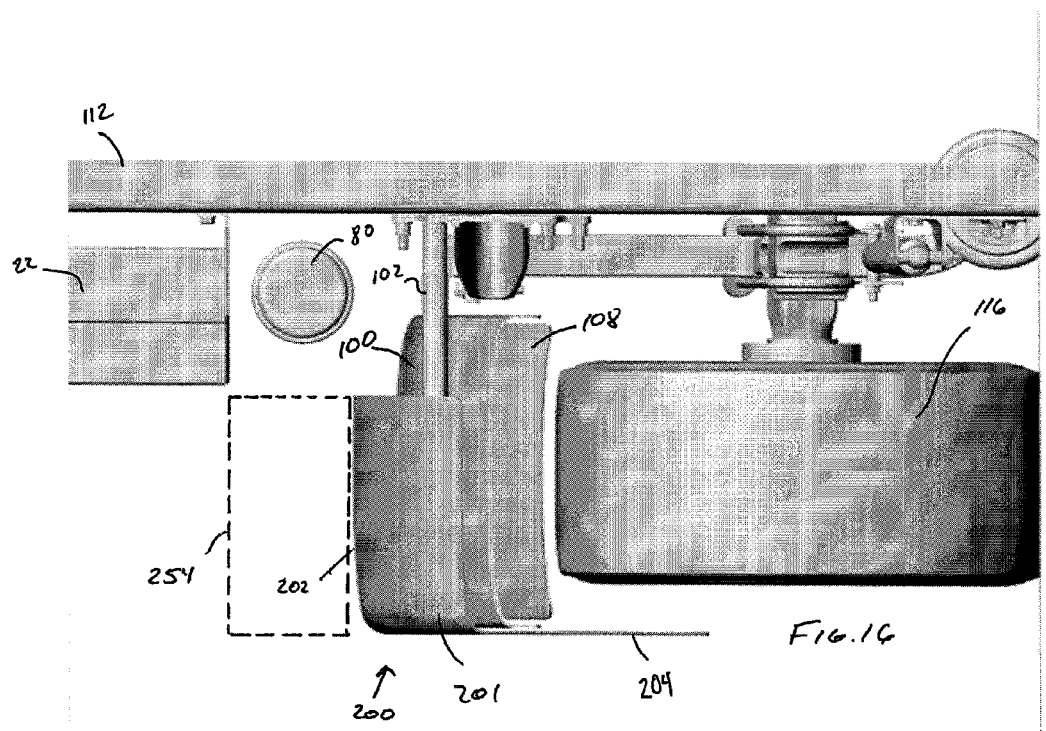
Figure 17:
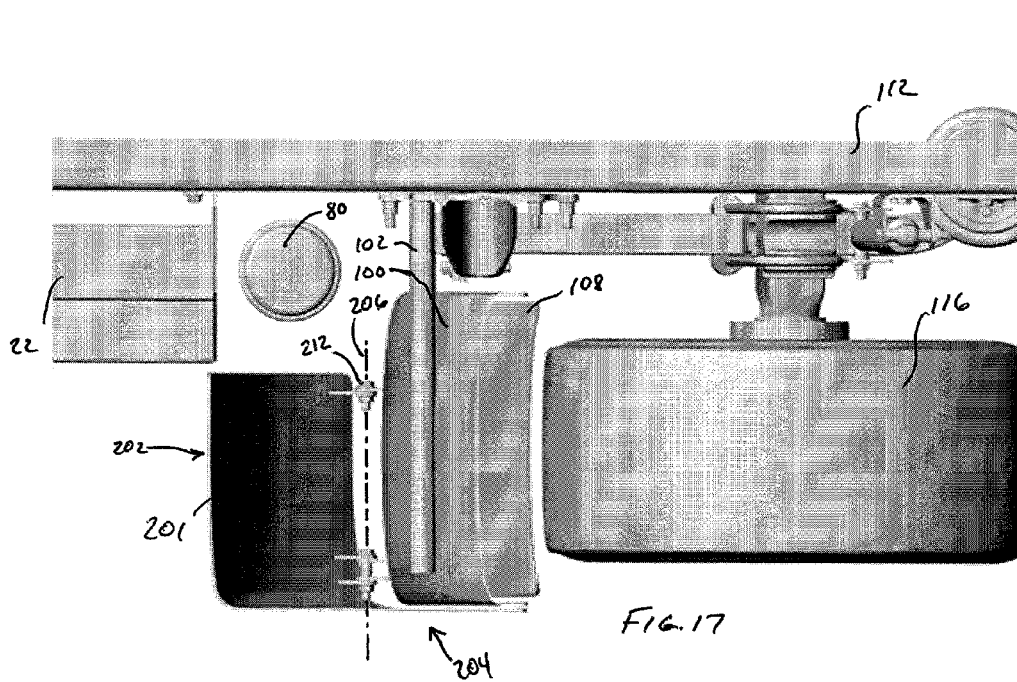

FIGS. 16 and 17 show top views of one embodiment of quarter fender assembly 200 in retracted and deployed positions, such as quarter fender assembly 200 depicted in FIGS. 14 and 15, respectively. Similar to side space area 252 discussed above, when quarter fender assembly 200 is retracted, space (indicated by dashed lines and referred to as floor space area 254) may be created to allow access to various components. In some embodiments, hinge pin 212 may allow quarter fender assembly 200 to rotate about axis 206.

Quarter fender assembly 200 depicted in FIGS. 14-17 may be hinged to components of a typical quarter fender or may be formed with a selected hinge axis 206 based on a component such as cylinder 80, suspension components 119, wheels 116, etc., a desired side space area, a desired floor space area, etc.

Figure 18A:
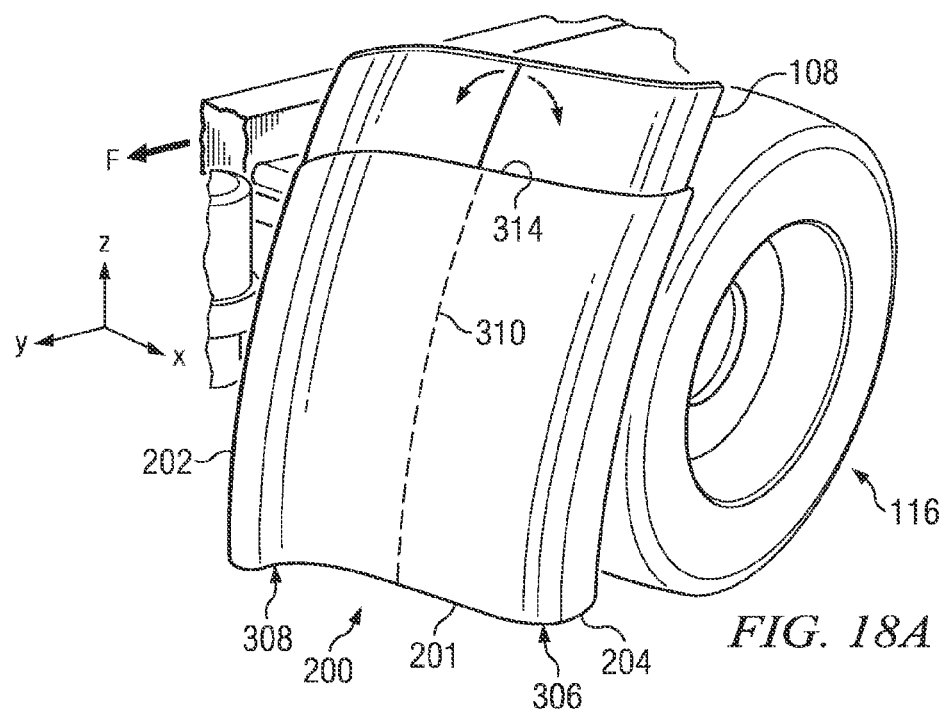
FIG. 18A depicts a partial view of one embodiment of quarter fender assemblies having curvilinear panels.
Figure 19:
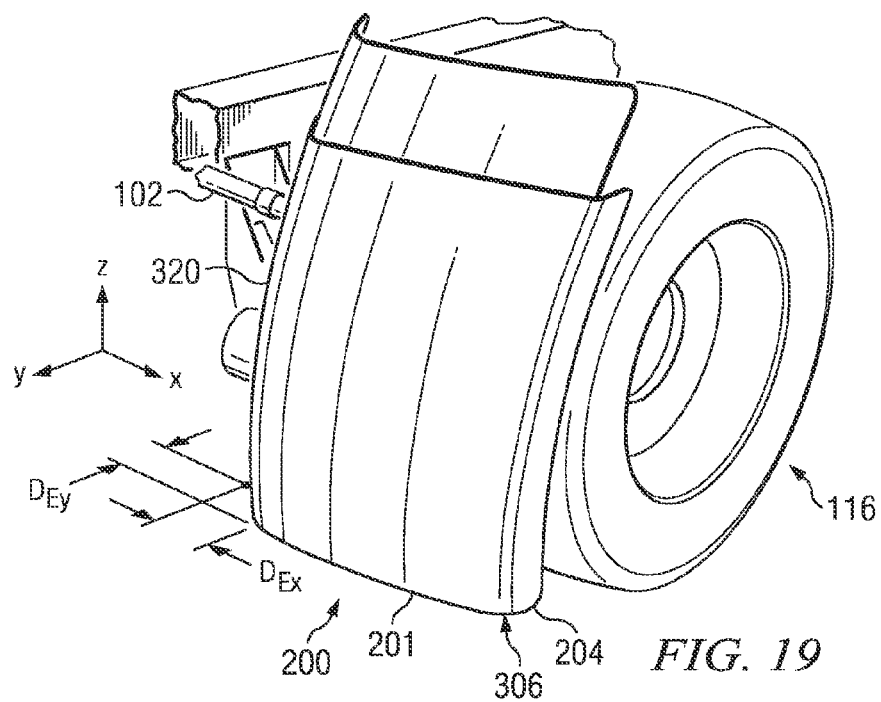
FIG. 19 depicts a partial view of embodiments of a quarter fender assembly.
Figure 20:
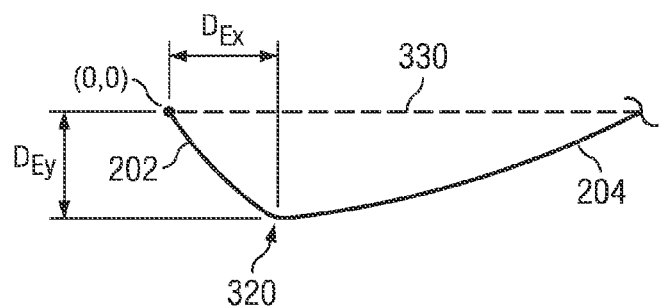
FIG. 20 depicts a partial view of a tractor-trailer transition zone, illustrating one embodiment of a quarter fender assembly with an aerodynamic deflector flap.

In other embodiments, various aerodynamic features are integrated into a quarter fender panel. FIGS. 18A, 19, and 20 depict partial perspective views of a tractor-trailer transition zone, illustrating one embodiment in which aerodynamic features of a quarter fender panel 201 are integrated with a quarter fender deflector flap 108.

Figure 18B:
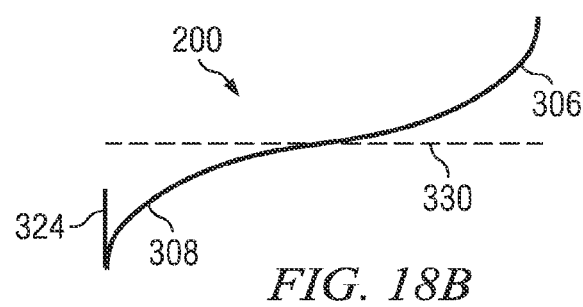
FIG. 18B depicts a graphical representation of a curve profile of one embodiment of a quarter fender panel.

A quarter fender panel 201 can be formed with forward portion 202 having first bend 308 and rear portion 204 having second bend 306 selected for a desired aerodynamic flow. In some embodiments, such as depicted in FIG. 18B, first bend 308 may have a concavity and second bend 306 may have a convexity such that the shape of first bend 308 is different than the shape of second bend 306. The horizontal cross-sectional profile of one embodiment of quarter fender panel 201 may be referred to as an "S-shape." FIG. 18B depicts a diagrammatic representation of one embodiment, illustrating the shapes in comparison with the profile 330 of a typical quarter fender flap.

Quarter fender panel 201 may have line of inflection 310 separating forward portion 202 and rear portion 204. Line of inflection 310 may be substantially in the middle of quarter fender panel 201 or may be offset to either side. Upper edge 314 may contact deflector flap 108. In some embodiments, such as depicted in FIG. 18B, quarter fender panel 201 may include catch 324 on an inside edge. Catch 324 may be formed having a curvature different than forward portion 202 or rear portion 204, or may have a different thickness, or may have another inflection point such that catch 324 minimizes the amount of air that is able to flow in an undesired path.

Leading edge 209 of forward portion 202 may be more inboard than trailing edge 207 of rear portion 204, with the trailing edge being outboard of the wheel assembly 116. According to one embodiment, quarter fender panel 201 may be generally parallel to the outer plane of wheel assembly 116 proximate to edge 207. Quarter fender panel 201 can be shaped to allow attached flow along outer surfaces 215 and 217.

FIG. 19 depicts a perspective view of one embodiment of quarter fender assembly 200 having a quarter fender panel 201 with an asymmetric angled surface to assist directing flow both inside of wheels 116 and outside of wheels 116. As depicted in FIG. 20, in some embodiments, quarter fender panel 201 may be asymmetric to provide a desired deflection or direction of air flow. A leading edge 320 may be located at some distance $D_{Ex}$ from an edge and extend some distance $D_{Ey}$ in front of a plane 330 normally associated with a typical deflector flap.

Figure 21:
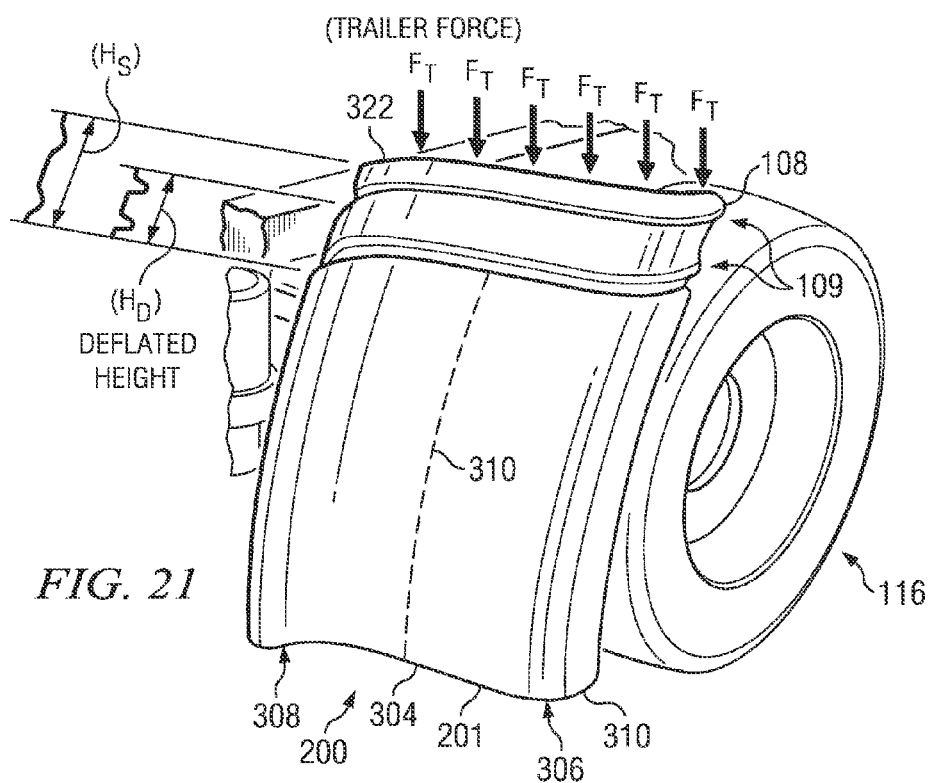
FIG. 21 depicts a partial view of embodiments of a quarter fender assembly.

FIG. 21 depicts quarter fender panel 201 having an asymmetric curved surface. Furthermore, FIG. 21 depicts one embodiment in which deflector flap 108 includes compression regions 109.

Embodiments disclosed herein may include one or more compression regions 109 may ensure substantially overall contact between deflector flap 108 and a trailer to reduce undesired air flow paths, or may reduce the chance or extent of damage to the trailer or deflector flap 108 as a result of contact.

Figure 22:
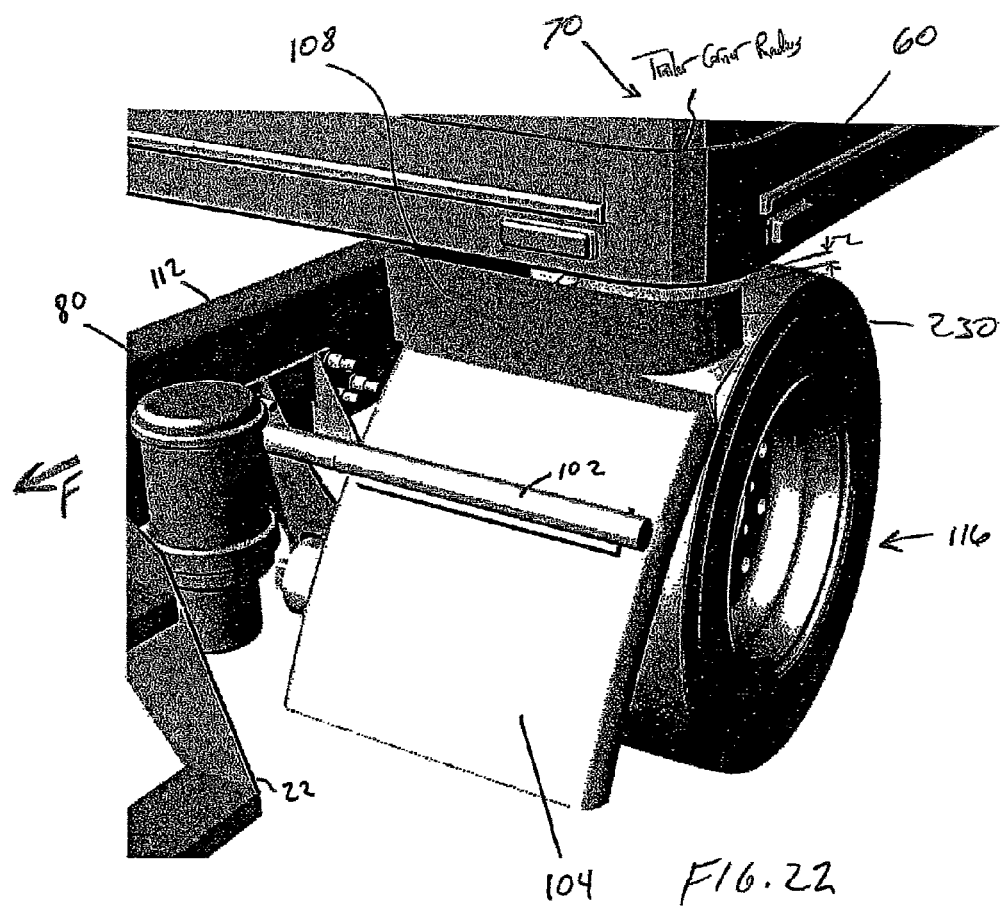
FIG. 22 depicts a partial perspective view of a truck-trailer connection.

Embodiments disclosed herein may further include deflector flaps 108 configured to reduce drag or direct air flow along a desired path. FIG. 21 depicts one embodiment of a deflector flap, and FIG. 22 depicts one embodiment of a deflector flap 108 in conjunction with a trailer 60. Modern trailers (especially those hauled by tractors, in the freight/carrier industry) have radiused vertical edges 70, between 1" to 10", for example, to reduce aerodynamic drag. The attached airflow leaving the tractor or cab separates and ideally re-attaches to the sides of the trailer. This beneficial flow re-attachment is more easily obtained when these trailer edges are rounded. When the ambient wind direction is not parallel to the direction of vehicle motion, there exists yaw, and under yaw, the airflow around the vehicle may change significantly. In the case where the side wind is approximately 7 mph (the average wind speed in a given region), airflow can enter the gap region between the tractor cab and trailer front whereby high momentum flow may impact the front surface of the trailer creating additional aerodynamic drag.

Deflector flap 108 may include radiused sections for improved airflow about wheel assembly 116. In one embodiment, a radius or curvature of deflector flap 108 may be selected based on a curvature or radius of the trailer. Advantageously, by maintaining the same radius as the trailer, deflector flap 108 may cooperate with a trailer edge to ensure a desired fluid flow or to obtain an aesthetically matching radius between a truck and the trailer.

FIG. 22 depicts a partial perspective view of a truck-trailer connection, including deflector flap 108 configured to minimize gap 270 between truck 60 and deflector flap 108. Deflector flap 108 may be coupled with quarter fender panel 201 or pipe 102 for attachment to frame rail 112. One or more embodiments of quarter fender assembly 200 (not shown) may be used in conjunction with deflector flap 108 to deflect or direct air flow along a desired path or around selected components.

Figure 23A:
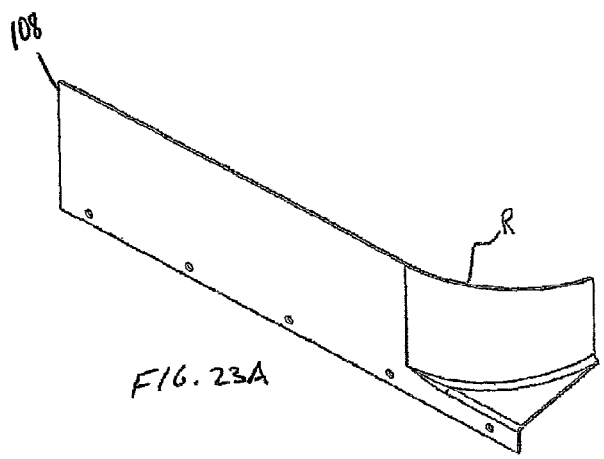
FIGS. 23A-23E depict top perspective, front and side views of one embodiment of a deflector flap.
Figure 23B:
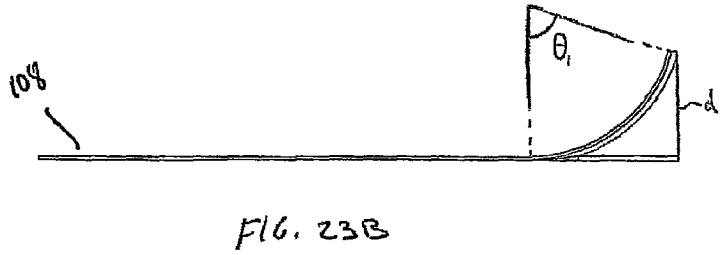
Figure 23D:
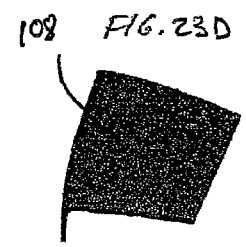
Figure 23C:
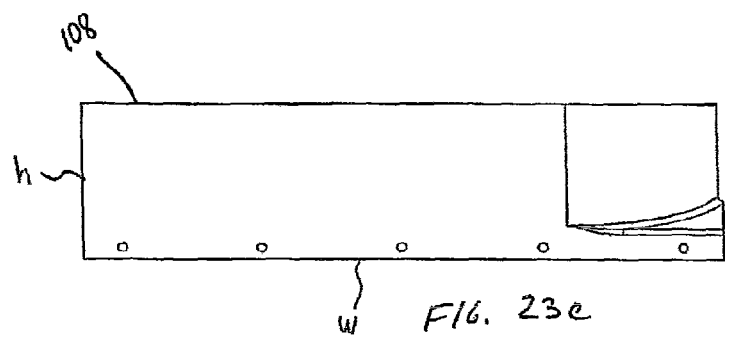
Figure 23E:
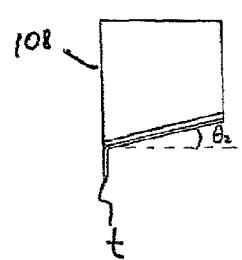

A shape or configuration of deflector flap 108 may be based on several factors. FIG. 23A depicts a perspective view of one embodiment of an aerodynamic deflector flap 108 having a radiused outer section. FIG. 23B depicts a top view of one embodiment of deflector flap 108, such as depicted in FIG. 23A, illustrating the curvature and depth of an aerodynamic deflector flap. FIG. 23C depicts a front view of one embodiment of deflector flap 108, such as depicted in FIGS. 23A and 23B, illustrating a height and width. FIG. 23D depicts a side view of one embodiment of deflector flap 108, such as depicted in FIGS. 23A-23C in a deflected state. FIG. 23E depicts a side view of one embodiment of deflector flap 108, such as depicted in FIGS. 23A-23D, illustrating an aerodynamic deflector flap having thickness t and draft angle $\theta_2$. In some embodiments, radius R may be based upon radius 70 of an associated trailer edge. In one embodiment, radius R may be selected between 1 inch and 10 inches. In some embodiments, bend angle $\theta_1$ may be selected to affect flow separation or trajectory. In one embodiment, bend angle $\theta_1$ may be between 5 degrees and 90 degrees. In some embodiments, depth d may be selected to affect separation or trajectory. In one embodiment, depth d may be between 0.5 inches and 8 inches. In some embodiments, height h may be selected to contact a trailer or provide a desired spacing between a trailer and quarter fender assembly 200. In one embodiment, height h may be between 2 inches and 8 inches. In some embodiments, width w may be selected to affect separation or trajectory. In one embodiment, width w may be between 12 inches and 30 inches. In some embodiments, thickness t may be selected and potentially varied to improve aerodynamic loading, debris impact loading, or loading by trailer 60. In one embodiment, thickness t may be between $1/16$ inches and $1/4$ inches. In one embodiment, thickness t may vary relative to height h, width w, or depth d. In some embodiments, draft angle $\theta_2$ may be selected to affect separation or trajectory or to avoid contact of deflector flap 200 or 300 when in a deflected state. In one embodiment, draft angle $\theta_2$ may be between 3 degrees and 60 degrees. In one embodiment, draft angle $\theta_2$ may be selected to have a desired deflection at a selected speed to produce a desired drag force.

FIGS. 24A-24D depict top perspective, front and side views of one embodiment of an aerodynamic and crushable deflector flap 108. In one embodiment, deflector flap 108 may have curved extension 240 configured to "catch" air to determine a desired air flow. By selecting an appropriate position and extension distance of curved extension 240, air flow may be better directed with decreased drag. In some embodiments, deflector flap 108 may include one or more cutout portions 255 designed to allow deflector flap 108 to deflect preferably when a trailer contacts deflector flap 108.

Figure 25A:
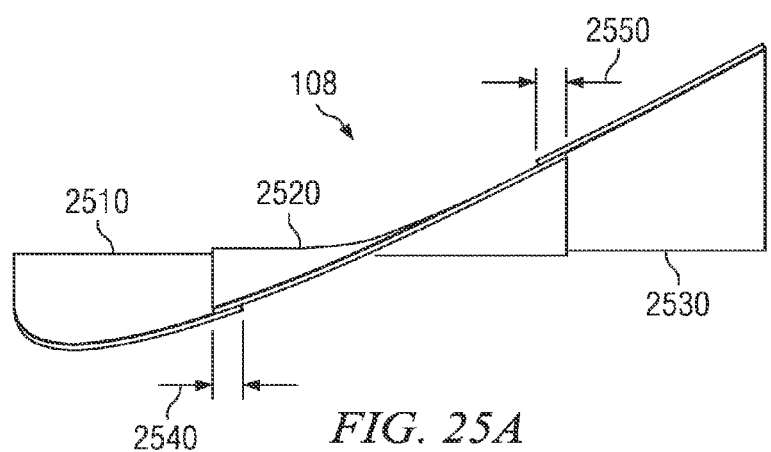

FIGS. 25A-25E depict top perspective, front and side views of one embodiment of a multiple piece aerodynamic and crushable deflector flap. In one embodiment, deflector flap 108 may comprise discrete sections. FIGS. 25A-25E depict one embodiment having three sections. However, fewer or more sections may be selected based on manufacturing costs, complexity, desired stiffness, or some other factor. As depicted in FIGS. 25A-25E, inner section 2510 may have a first set of dimensions, including material, height h, width w, thickness t, curvature, etc., and may include debris catch, middle section 2520 may have a second set of dimensions, including material, height h, width w, thickness t, curvature, etc., and outer section 2530 may have a third set of dimensions, including material, height h, width w, thickness t, curvature, depth, bend angle $\theta_1$, draft angle $\theta_2$, etc. Overlap sections 2540 and 2550 may be sized or positioned to provide a desired stiffness to deflector flap 108. As depicted in FIG. 25C, stiffness of sections 2510-2550 may be selected to enable deflector flap 108 to deflect into a deflected configuration 2560.

Figure 27:
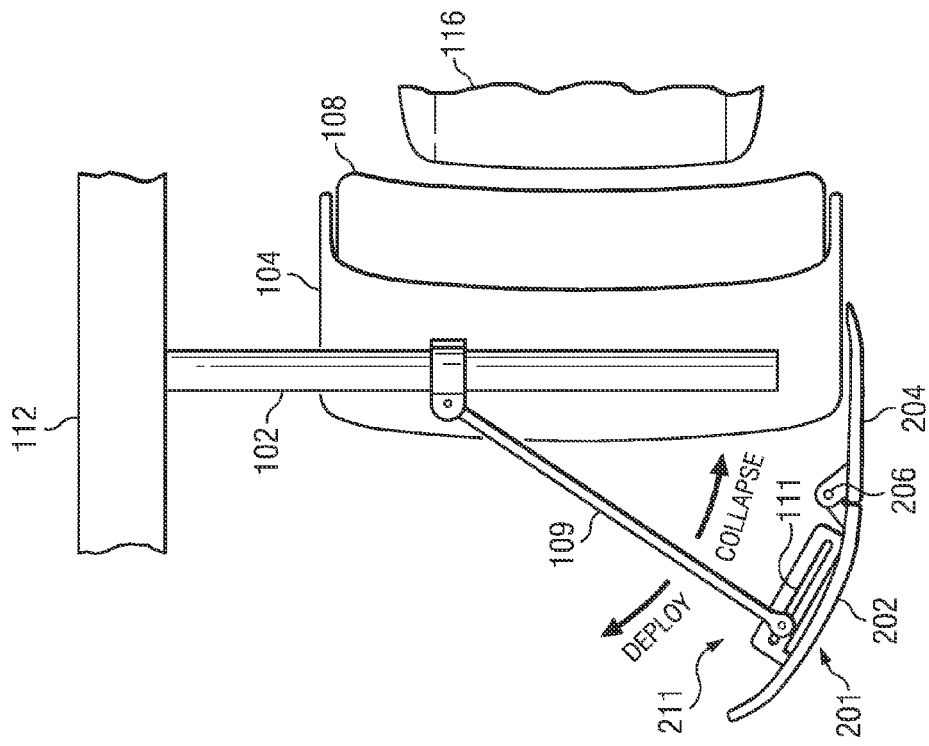
FIGS. 26 and 27 depict top views of embodiments of hinging and locking quarter fender assemblies.
Figure 26:
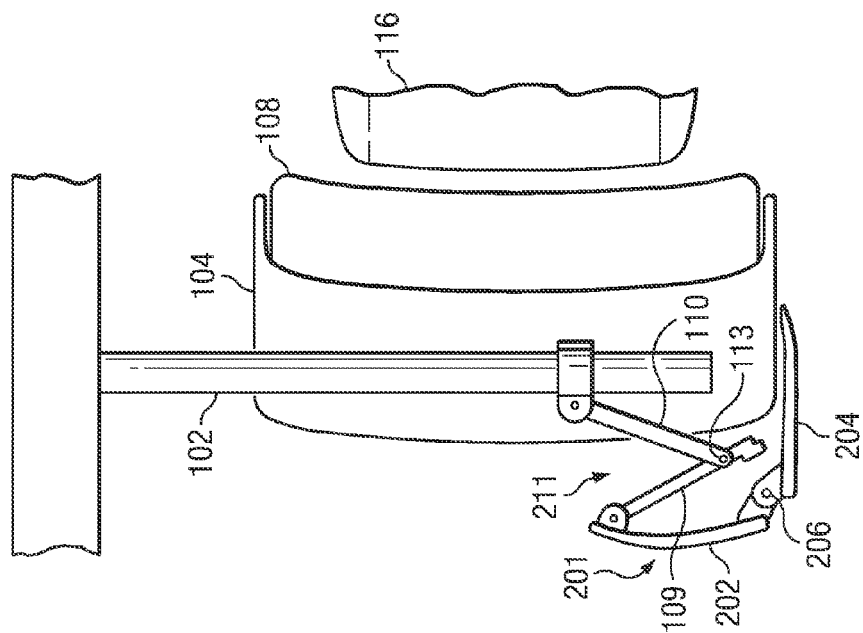

A quarter fender panel 201 may be lockable in a selected configuration. For example, it may be desirable to keep quarter fender panel 201 in a retracted position while the truck or trailer is being serviced, such as to prevent damage to components, avoid tearing clothes on components, etc. FIG. 26 depicts one embodiment of quarter fender assembly 200 in which securing mechanism 211 is used to allow the quarter fender panel 201 to at least partially retract for improved access to trailer/tractor parts when necessary. In some embodiments, first arm 109 and second arm 110 may rotate about pivot 113 to allow forward portion 202 to be rotated into a preferred configuration. FIG. 27 depicts one embodiment of quarter fender assembly 200 in which securing mechanism 211 is used to allow the quarter fender 201 to at least partially retract for improved access to trailer/tractor parts when necessary. In some embodiments, one end of arm 109 may slide along channel 111 to allow forward portion 202 to be rotated into a preferred configuration. Embodiments disclosed herein may further be locked in a deployed position, such as to prevent side strong winds from deflecting quarter fender panel 201, to protect components, etc.

A first quarter fender may be configured and positioned to provide a first fluid flow around one or more wheel assemblies. A second quarter fender may be configured and positioned behind one or more wheel assemblies to provide a second fluid flow around the wheel assemblies. First and second quarter fenders may cooperate to form a substantially continuous fluid flow profile around one or more of the one or more wheel assemblies. In some embodiments, a first quarter fender positioned forward one or more wheel assemblies, a second quarter fender interposed between two wheel assemblies, and a third quarter fender positioned behind one or more wheel assemblies may cooperate to form a substantially continuous fluid flow profile around the wheel assemblies.

Figure 28:
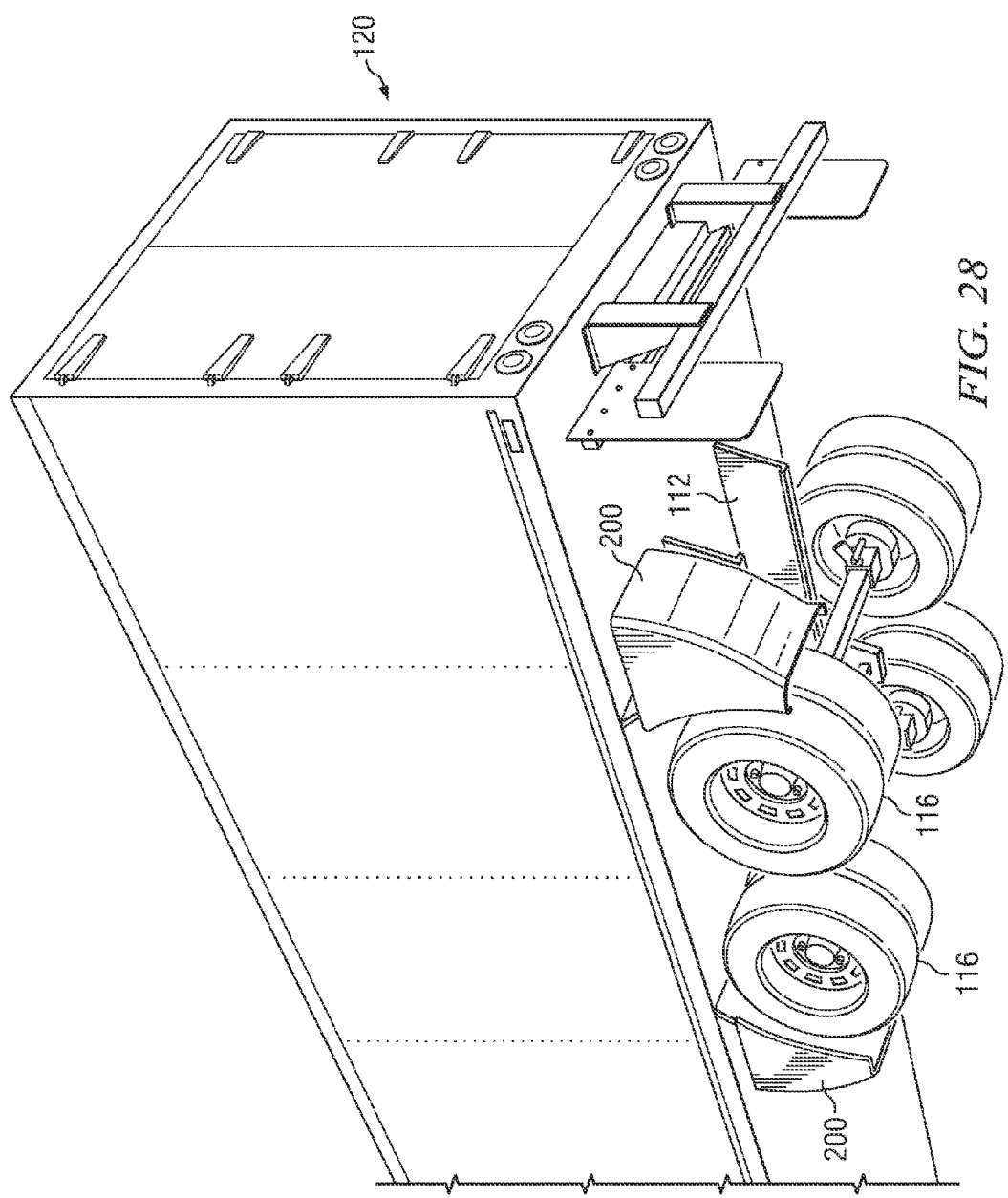
FIGS. 28-30 depict embodiments of quarter fender assemblies having hinged portions.
Figure 29:
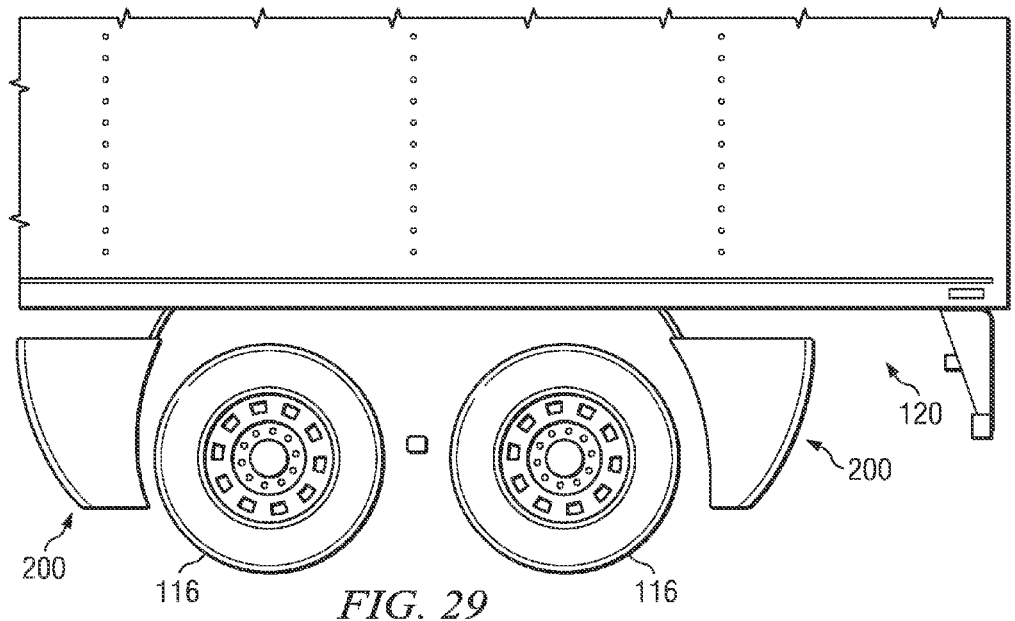
Figure 30:
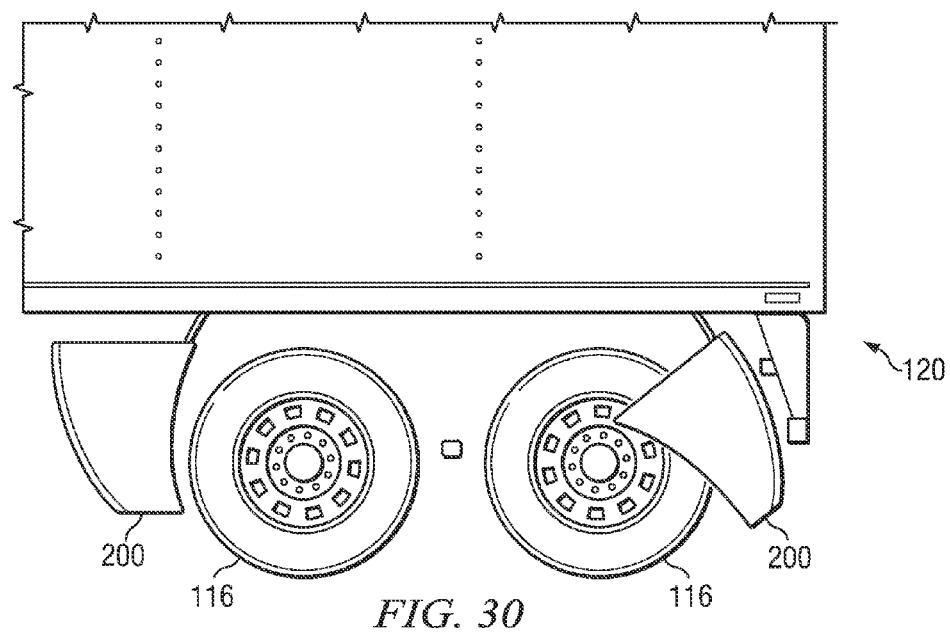
Figure 31:
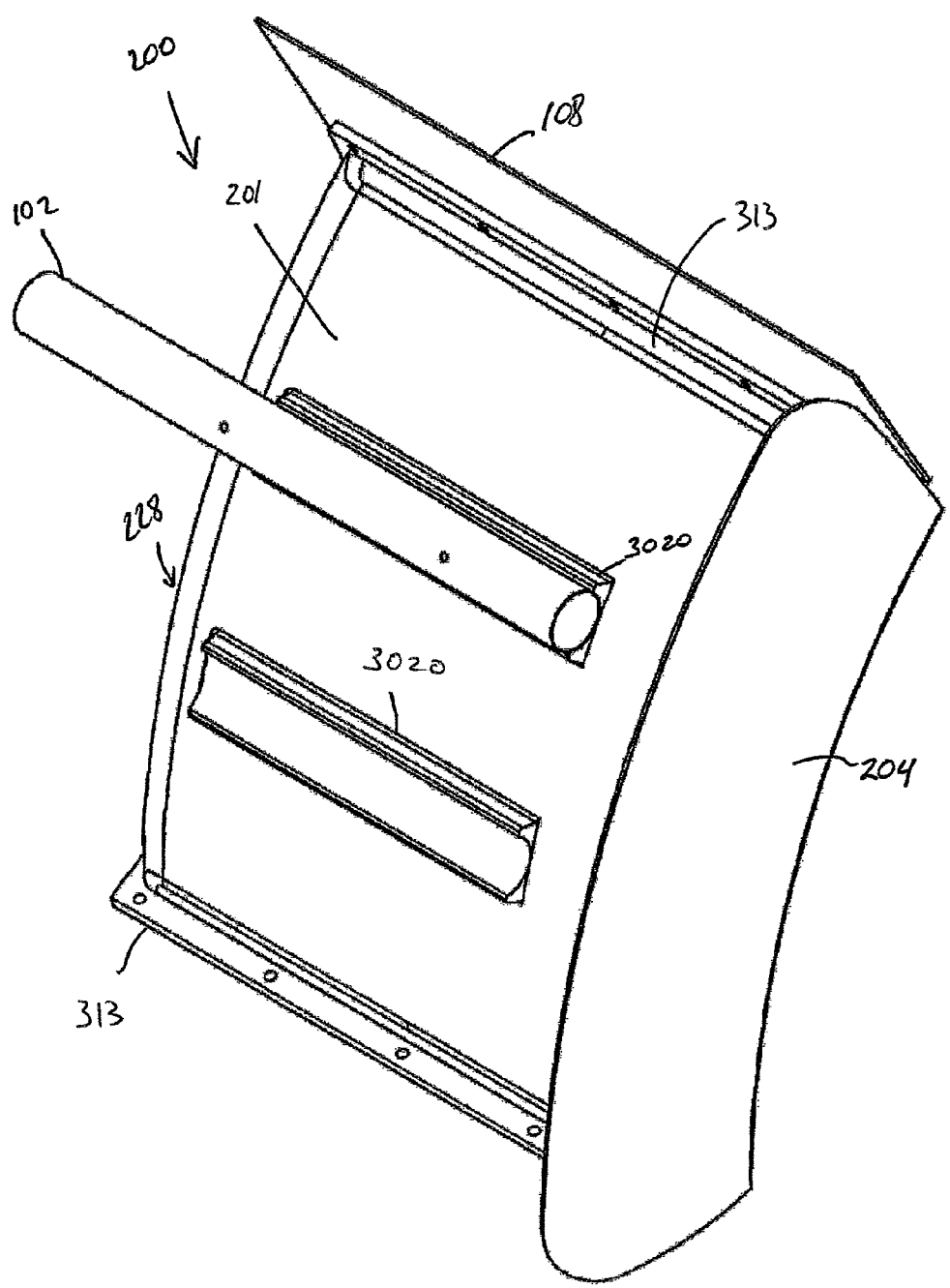

FIGS. 28-30 depict partial views of a trailer having embodiments of quarter fender assembly 200 installed thereon. As depicted in FIGS. 28-30, quarter fender assembly 200 can be installed in front of or behind wheels 116. In some embodiments, a design of one or more quarter fender assemblies can be based on providing a desired air flow, cooling selected components, reducing spray/splash/debris being thrown by the trailer, or some other criteria. FIG. 30 shows quarter fender deflected during one mode of operation of the vehicle, whereby the trailer wheel assembly is translated toward the rear of the trailer. In this mode of operation, the aerodynamic quarter fender toward the rear of the trailer could be crushed or otherwise severely damaged if it is not deflectable.

Embodiments disclosed herein may provide various quarter fender assemblies 200 for providing a desired airflow. FIGS. 31 and 32A-32D depict views of embodiments of quarter fender assemblies 200. In some embodiments, quarter fender assembly 200 may include quarter fender panel 201 configured with fittings 3010 to receive pipe 102 of various diameters, to provide quarter fender assembly at a desired height off the ground, etc. Quarter fender assembly 200 may also include deflector flap 108 at a desired angle, quarter fender panel 201 at a selected angle, and other devices to direct air flow along a desired path.

Figure 1:
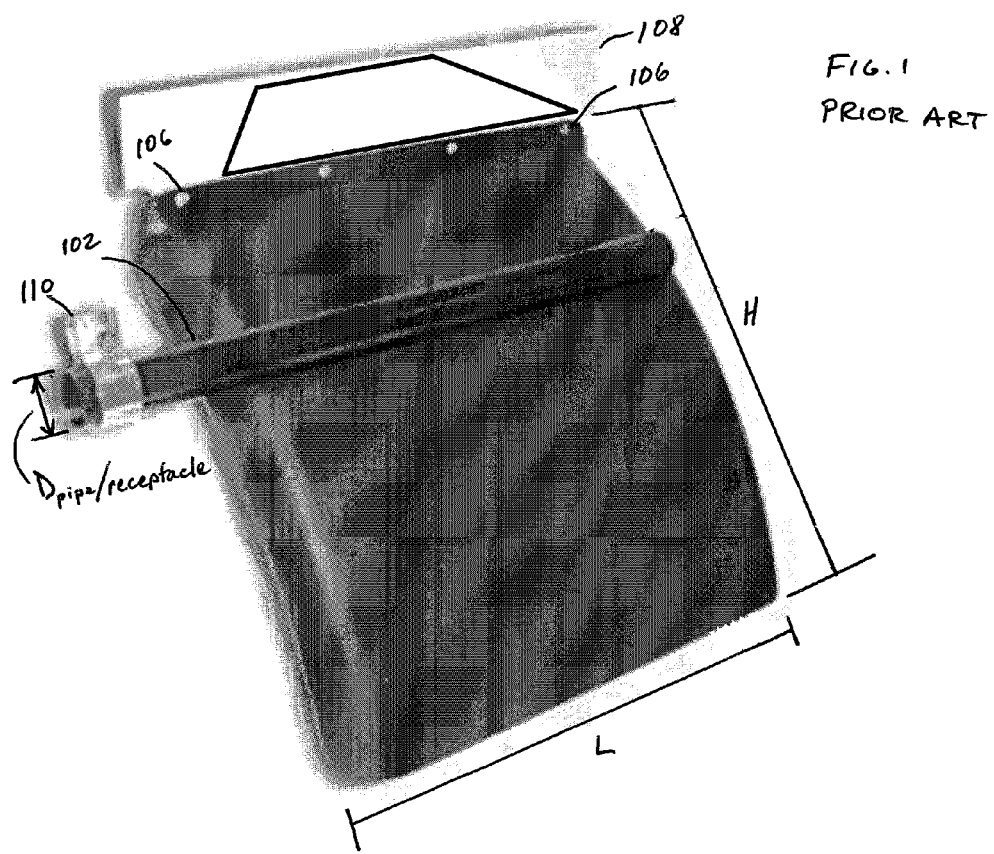
FIG. 1 depicts a perspective view of an existing quarter fender.
Figure 2:
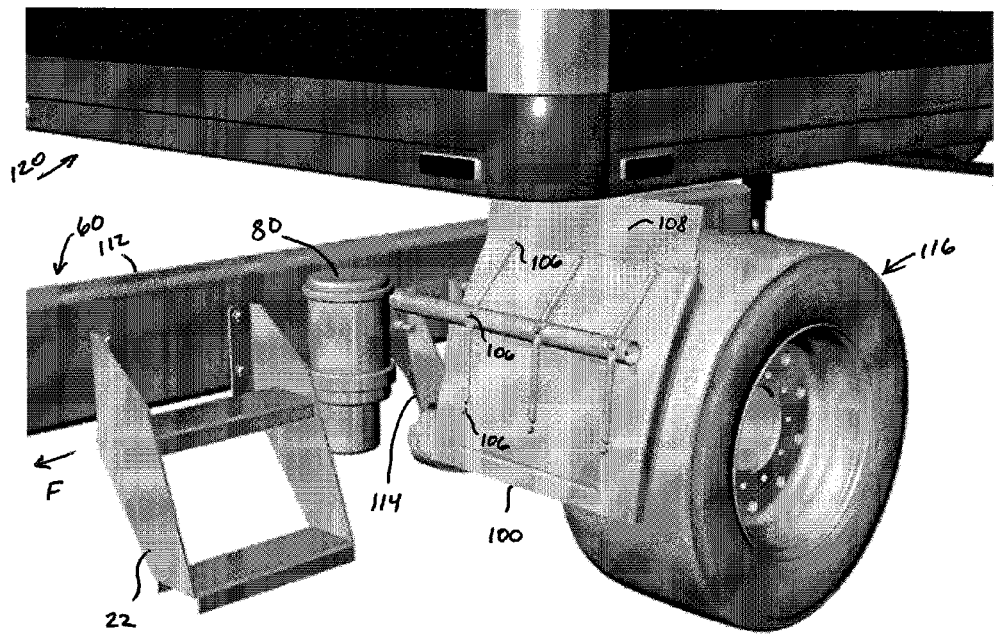
FIGS. 2 and 3 depict partial perspective and side views of existing quarter fenders coupled to a frame shown with an attached trailer.
Figure 3:
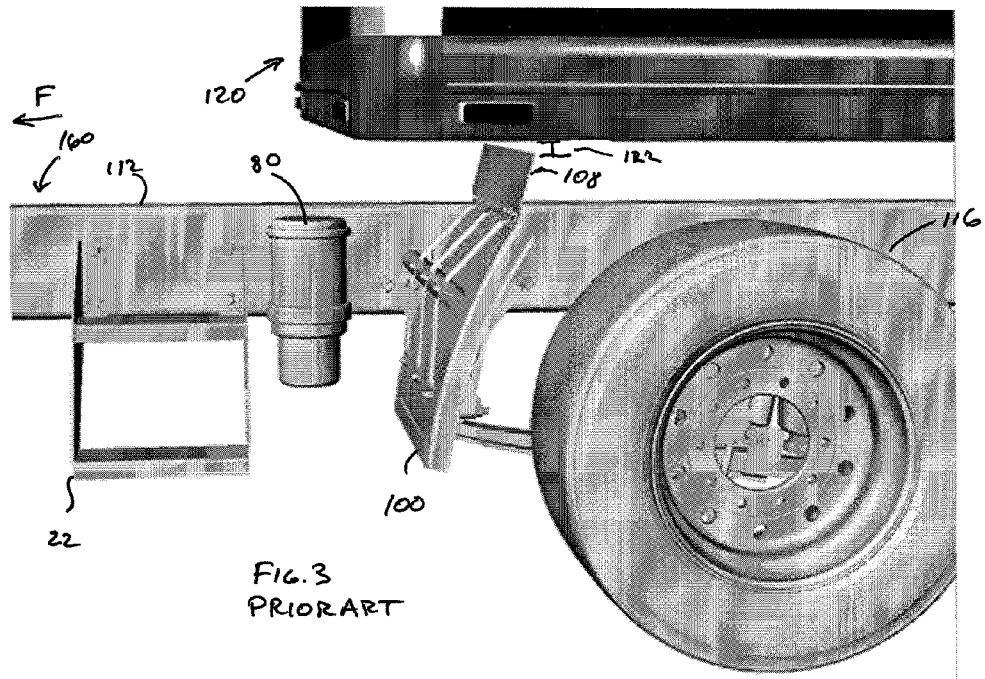

As shown in FIGS. 31 and 32A-32D of asymmetric aerodynamic quarter fender assemblies, a quarter fender panel 201 is provided with an aerodynamic feature that is asymmetric. Most standard quarter fenders are symmetric (see FIG. 1), which allows the mounting pipe 102 to attach the quarter fender panel 201 to the truck from either the left side or the right side. The benefit of conventional symmetric quarter fenders are that left and right side quarter fender panels 201 are identical. One disadvantage of symmetric quarter fenders are that the pipe mounting portions and pipes must extend a greater width across the quarter fender. A further disadvantage is that these quarter fenders are not provided with an integrated aerodynamic surface which may be asymmetric without molding each side separately. Embodiments disclosed herein may provide an improved asymmetric quarter fender panel 201 which is provided with two or more pipe mounting sections 3020 and two or more deflector flap mounting sections 313 which are approximately symmetric across a center line. In one embodiment, a right-side quarter fender panel 201 can be provided by using one of the two pipe mounting sections 3020 and a left-side quarter fender panel 201 can be provided by using the other of the two pipe mounting sections 3020 and with the quarter fender panel 201 rotated 180 degrees. Each right side and left side quarter fender panel 201 can have one or more asymmetric aerodynamic features oriented to reduce drag when assembled, while each quarter fender panel 201 may be manufactured identically. The invention provides a cost-effective way to produce quarter fender panels 201. Note that the pipe mounting sections 3020 can be provided on the outside surface and/or the inside surface of the quarter fender panel 201. An advantage of having both may be to allow the quarter fender panel 201 to be installed at different distances away from the wheel using the same mounting pipe position. A further advantage of having both deflector flap mounting portions may be that a lower deflector flap can be attached and configured for further reduced aerodynamic drag, and reduced wheel splash and spray.

Those skilled in the art will appreciate after reading this disclosure that the various features, configurations and orientations depicted and described herein may be combined with other or similar features, configurations and orientations to produce quarter fender assemblies 200 for generating a desired air flow to reduce spray/splash, improve aerodynamic efficiency of a tractor, reduce the likelihood for rocks propelled by rotating tires from contacting the cab, and other advantages.

What is claimed is:

1. A quarter fender assembly comprising:
   a quarter fender panel for coupling with a support extending laterally outward from a frame rail of a vehicle, the quarter fender panel comprising an upper edge, a lower edge, a leading edge, a trailing edge and a substantially continuous aerodynamic outer surface extending from the leading edge of the quarter fender panel to the trailing edge of the quarter fender panel and comprising:
  a rear portion having a rear portion rear edge defining the trailing edge of the quarter fender panel; and
  a forward portion having a forward portion front edge defining the leading edge of the quarter fender panel, the leading edge of the quarter fender panel positioned inboard from the trailing edge of the quarter fender panel;
  wherein the forward portion comprises a forward portion aerodynamic outer surface to direct air flow in a first direction generally outward from the leading edge of the quarter fender panel to the rear portion,
  the rear portion comprises a rear portion aerodynamic outer surface to direct the deflected air flow from the forward portion in a second direction to the trailing edge of the quarter fender panel, and
  the substantially continuous aerodynamic outer surface comprises the forward portion aerodynamic outer surface and the rear portion aerodynamic outer surface; and
a deflector flap extending from a top edge of the quarter fender panel a selected distance to contact a trailer, the deflector flap comprising a deflector flap upper edge, a deflector flap lower edge, a deflector flap leading edge, a deflector flap trailing edge and a substantially continuous aerodynamic deflector flap outer surface extending from the deflector flap leading edge to the deflector flap trailing edge and comprising:
  a compressible region;
  an outboard section having a deflector flap rear edge defining the deflector flap trailing edge; and
  an inboard section having a deflector flap front edge defining the deflector flap leading edge selected for contact with an airflow, the deflector flap leading edge positioned inboard from the deflector flap trailing edge;
  wherein the inboard section comprises an inboard section aerodynamic deflector flap outer surface to direct air flow in a direction generally outward from the deflector flap leading edge to the outboard section,
  the outboard section comprises an outboard section aerodynamic deflector flap outer surface to direct air flow deflected from the deflector flap inboard section in a direction to the deflector flap trailing edge, and
  the substantially continuous aerodynamic outer surface comprises the inboard section aerodynamic deflector flap outer surface and the outboard section aerodynamic deflector flap outer surface.

2. The quarter fender assembly of claim 1, comprising a hinge mechanism for connecting the forward portion to the rear portion.

3. The quarter fender assembly of claim 2, wherein the hinge mechanism comprises a living hinge mechanism.

4. The quarter fender assembly of claim 1, wherein the continuous aerodynamic deflector flap outer surface has a radius of curvature, the deflector flap adapted to cooperate with the trailer to create an aerodynamic fluid flow.

5. The quarter fender assembly of claim 1, wherein one or more of the forward portion aerodynamic outer surface and the rear portion aerodynamic outer surface comprises a set of ribs oriented horizontally.

6. The quarter fender assembly of claim 1, wherein the forward portion is deflectable inward to allow access to components.

7. The quarter fender assembly of claim 1, wherein the forward portion comprises a first curvature and the rear portion comprises a second curvature, wherein the first curvature is selected to direct airflow along a first path, wherein the second curvature is selected to direct airflow along a second path, wherein the first curvature is concave and the second curvature is convex, wherein substantially all airflow contacting the quarter fender panel is directed to one side of the quarter fender panel.

8. A quarter fender assembly for connection with a quarter fender coupled to a support extending laterally outward from a frame rail of a vehicle, the quarter fender assembly comprising:
a quarter fender panel having an upper edge, a lower edge, a leading edge, a trailing edge and a substantially continuous aerodynamic outer surface extending from the leading edge of the quarter fender panel to the trailing edge of the quarter fender panel and comprising:
  a rear portion having a rear portion rear edge defining the trailing edge of the quarter fender panel;
  a forward portion having a forward portion front edge defining the leading edge of the quarter fender panel, the leading edge of the quarter fender panel positioned inboard from the trailing edge of the quarter fender panel;
  wherein the forward portion comprises a forward portion aerodynamic outer surface to direct air flow in a first direction generally outward from the leading edge of the quarter fender panel to the rear portion;
  the rear portion comprises a rear portion aerodynamic outer surface to direct the deflected air flow from the forward portion in a second direction to the trailing edge of the quarter fender panel, and
  the substantially continuous aerodynamic outer surface comprises the forward portion aerodynamic outer surface and the rear portion aerodynamic outer surface; and
a hinge for coupling the rear portion and the forward portion; and
a deflector flap extending from a top edge of the quarter fender panel a selected distance to contact a trailer, the deflector flap comprising a deflector flap upper edge, a deflector flap lower edge, a deflector flap leading edge, a deflector flap trailing edge and a substantially continuous aerodynamic deflector flap outer surface extending from the deflector flap leading edge to the deflector flap trailing edge and comprising:
  a compressible region;
  an outboard section having a deflector flap rear edge defining the deflector flap trailing edge; and
  an inboard section having a deflector flap front edge defining the deflector flap leading edge selected for contact with an airflow, the deflector flap leading edge positioned inboard from the deflector flap trailing edge;
  wherein the inboard section comprises an inboard section aerodynamic deflector flap outer surface to direct air flow in a direction generally outward from the deflector flap leading edge to the outboard section,
  the outboard section comprises an outboard section aerodynamic deflector flap outer surface to direct air flow deflected by the deflector flap inboard section in a direction to the deflector flap trailing edge, and
  the substantially continuous aerodynamic outer surface comprises the inboard section aerodynamic deflector flap outer surface and the outboard section aerodynamic deflector flap outer surface.

9. The quarter fender assembly of claim 8, wherein the hinge further comprises a spring mechanism for biasing the quarter fender panel in a selected position.

10. The quarter fender assembly of claim 8, wherein the hinge is configured to allow rotation about a vertical axis.

11. The quarter fender assembly of claim 8, wherein the hinge may be configured to prevent rotation in one or more positions.

12. A quarter fender assembly comprising:
a pipe for attachment to and extending laterally outward from a frame rail of a vehicle;
a quarter fender coupled with the pipe; and
a quarter fender panel coupled with the pipe or the quarter fender, the quarter fender panel comprising an upper edge, a lower edge, a leading edge, a trailing edge and a substantially continuous aerodynamic outer surface extending from the leading edge of the quarter fender panel to the trailing edge of the quarter fender panel and comprising:
a forward portion having a forward portion front edge defining the leading edge of the quarter fender panel; and
a rear portion having a rear portion rear edge defining the trailing edge of the quarter fender panel,
wherein the forward portion comprises a forward portion aerodynamic outer surface to direct air flow in a first direction generally outward from the leading edge to the rear portion,
the rear portion comprises a rear portion aerodynamic outer surface to direct the deflected air flow from the forward portion in a second direction to the trailing edge and is configured to support the forward portion and
the substantially continuous aerodynamic outer surface comprises the forward portion aerodynamic outer surface and the rear portion aerodynamic outer surface.

13. The quarter fender assembly of claim 12, further comprising a hinge coupling the forward portion to the rear portion, wherein the forward portion is rotatably coupled with the rear portion.

14. The quarter fender assembly of claim 12, wherein the quarter fender has a first pipe mounting portion for mounting on a first side of the vehicle and second pipe mounting portion for mounting on a second side of the vehicle.

15. The quarter fender assembly of claim 14, wherein the quarter fender panel has a first deflector flap mounting section on a first edge and second deflector flap mounting section on a second edge, wherein the first edge and the second edge comprise the upper edge and the lower edge.

16. The quarter fender assembly of claim 14, wherein the quarter fender extends from inboard an inner wheel to outboard an outer wheel.

17. The quarter fender assembly of claim 12, wherein one or more of the forward portion aerodynamic outer surface and the rear portion aerodynamic outer surface comprises a set of ribs oriented horizontally.

18. The quarter fender assembly of claim 12, wherein the forward portion is deflectable inward to allow access to components.

19. The quarter fender assembly of claim 12, further comprising a plurality of mounting sections.

20. The quarter fender assembly of claim 19, wherein the plurality of mounting sections are adapted such that the quarter fender panel is mountable in a plurality of positions.

21. The quarter fender assembly of claim 12, wherein the forward portion comprises a first curvature and the rear portion comprises a second curvature, wherein the first curvature is selected to direct airflow along a first path, wherein the second curvature is selected to direct airflow along a second path, wherein the first curvature is concave and the second curvature is convex, wherein substantially all airflow contacting the quarter fender panel is directed to one side of the quarter fender panel.

* * * * *